United States Patent
Zhang et al.

(10) Patent No.: US 10,477,240 B2
(45) Date of Patent: Nov. 12, 2019

(54) LINEAR MODEL PREDICTION MODE WITH SAMPLE ACCESSING FOR VIDEO CODING

(71) Applicant: QUALCOMM Incorporated, San Diego, CA (US)

(72) Inventors: Kai Zhang, San Diego, CA (US); Jianle Chen, San Diego, CA (US); Li Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 15/845,484

(22) Filed: Dec. 18, 2017

(65) Prior Publication Data

US 2018/0176594 A1 Jun. 21, 2018

Related U.S. Application Data

(60) Provisional application No. 62/436,319, filed on Dec. 19, 2016.

(51) Int. Cl.
*H04N 19/59* (2014.01)
*H04N 19/186* (2014.01)
*H04N 19/176* (2014.01)
*H04N 19/105* (2014.01)
*H04N 19/593* (2014.01)
*H04N 19/11* (2014.01)
*H04N 19/159* (2014.01)

(52) U.S. Cl.
CPC .......... *H04N 19/59* (2014.11); *H04N 19/105* (2014.11); *H04N 19/11* (2014.11); *H04N 19/159* (2014.11); *H04N 19/176* (2014.11); *H04N 19/186* (2014.11); *H04N 19/593* (2014.11)

(58) Field of Classification Search
None
See application file for complete search history.

(56) References Cited

U.S. PATENT DOCUMENTS

| | | | | |
|---|---|---|---|---|
| 9,307,237 B2* | 4/2016 | Liu | ...... | H04N 19/503 |
| 2012/0328013 A1* | 12/2012 | Budagavi | ............ | H04N 19/105 |
| | | | | 375/240.12 |
| 2013/0188696 A1* | 7/2013 | Liu | ...... | H04N 19/593 |
| | | | | 375/240.12 |
| 2013/0188703 A1* | 7/2013 | Liu | ...... | H04N 19/503 |
| | | | | 375/240.12 |
| 2013/0188705 A1* | 7/2013 | Liu | ...... | H04N 19/50 |
| | | | | 375/240.12 |
| 2013/0272396 A1* | 10/2013 | Liu | ...... | H04N 19/50 |
| | | | | 375/240.12 |

(Continued)

OTHER PUBLICATIONS

Chen et al., CE6.a.4: Chroma intra prediction by reconstructed luma samples, JCTVC 5th Meeting, Geneva, Switerland, Mar. 16-23, 2011, Document JCTVC-E266, pp. 1-10 (Year: 2011).*

(Continued)

*Primary Examiner* — Reza Aghevli
(74) *Attorney, Agent, or Firm* — Shumaker & Sieffert, P.A.

(57) ABSTRACT

Techniques are described of linear model (LM) prediction mode. In one or examples, a video encoder or video decoder may limit the number of neighboring luma samples that are fetched for downsampling thereby increasing the speed at which the video encoder or video decoder is able to complete the LM prediction encoding or decoding.

72 Claims, 17 Drawing Sheets

(56) References Cited

U.S. PATENT DOCUMENTS

| | | | | |
|---|---|---|---|---|
| 2014/0233650 A1* | 8/2014 | Zhang | .................... | H04N 19/14 |
| | | | | 375/240.16 |
| 2016/0119631 A1* | 4/2016 | Kawamura | .......... | H04N 9/8045 |
| | | | | 375/240.12 |
| 2016/0277762 A1* | 9/2016 | Zhang | .................. | H04N 19/593 |
| 2017/0359595 A1* | 12/2017 | Zhang | .................. | H04N 19/159 |
| 2018/0131962 A1* | 5/2018 | Chen | ...................... | H04N 19/96 |
| 2018/0146211 A1* | 5/2018 | Zhang | .................. | H04N 19/159 |

OTHER PUBLICATIONS

Zhang et al., "New Chroma Intra Prediction Modes Based on Linear Model for HEVC," 19th IEEE International Conference on Image Processing Image Processing (ICIP), pp. 197-200, Sep. 2012. (Year: 2012).*

Chiu et al., Cross-channel technique to improve intra chroma prediction, JCTVC 6th Meeting, Torino, Italy, Jul. 14-22, 2011, Document JCTVC F502, pp. 1-6 (Year: 2011).*

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Wang Y-K. et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.

Boyce, et al., "Draft high efficiency video coding (HEVC) version 2, combined format range extensions (RExt), scalability (SHVC), and multi-view (MV-HEVC) extensions," Jun. 30-Jul. 9, 2014; (Joint Collaborative Team on Video Coding of ISO/IEC JTC1/SC29/WG11 and ITU-T SG.16); doc. No. JCTVC-R1013_v6, 541 pp.

Chen J., et al., "CE6.A.4: Chroma Intra Prediction by Reconstructed Luma Samples", 5th JCT-VC Meeting; 96th MPEG Meeting; Mar. 16, 2011-Mar. 23, 2011; Geneva; (Joint Collaborative Team on Video Coding of ISO/IEC JTC1/SC29/WG11 and ITU-T SG.16 ); URL: http://wftp3.itu.int/av-arch/jctvc-site/,,No. JCTVC-E266, Mar. 12, 2011, XP030008772, ISSN: 0000-0007 (10 pp).

Chiu Y.J., et al., "Cross-channel techniques to improve intra chroma prediction," 6. JCT-VC Meeting; 97. MPEG Meeting; Jul. 14, 2011-Jul. 22, 2011; Torino; (Joint collaborative Team on Video Coding of ISO/IEC JTC1/SC29/WG11 and ITU-T SG.16); URL: http://wftp3.itu.int/av-arch/jctvc-site/,, No. JCTVC-F502, Jul. 2, 2011 (Jul. 2, 2011), 6 pages, XP030009525.

Ford et al., "Colour space conversions," University of Westminster, London, Tech. Rep., Aug. 11, 1998, 31 pp.

Tech, et al., "MV-HEVC Draft Text 3 (ISO/IEC 23008-2:201x/PDAM2)," JVT Meeting; MPEG Meeting; Jan. 17-23, 2013; Antalya, ;(Joint Video Team of ISO/IEC JTCIISC29NVG11 and ITU-T SG.16 ); No. JCT3V-C1004_d3, version 4; Mar. 27, 2013; 34 pp.

U.S. Appl. No. 15/705,029, filed by Kai Zhang, filed Sep. 14, 2017.

International Search Report and Written Opinion—PCT/US2017/067344—ISA/EPO—dated Apr. 4, 2018 17 pages.

Zhang K., et al., "Enhanced Cross-component Linear Model Intra-Prediction", 4th JVET Meeting; Oct. 15, 2016-Oct. 21, 2016; Chengdu; (The Joint Video Exploration Team of ISO/IEC JTC1/SC29/WG11 and ITU-T SG.16 ); URL: http://phenix.int-evry.fr/jvet/, No. JVET-D0110-v4, Oct. 17, 2016, XP030150355, pp. 1-6.

* cited by examiner

Guide:

X = Location of luma sample

O = Location of chroma sample

LINEAR MODEL PREDICTION MODE WITH SAMPLE ACCESSING FOR VIDEO CODING

This application claims the benefit of U.S. Provisional Application No. 62/436,319, filed Dec. 19, 2016, the entire content of which is hereby incorporated by reference.

TECHNICAL FIELD

This disclosure relates to video encoding and decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized.

SUMMARY

In general, aspects of the disclosure are directed to techniques for downsampling neighboring luma samples for linear-model (LM) prediction mode. As described in more detail, a video encoder or video decoder may be configured to fetch neighboring luma samples as part of downsampling for constructing a chroma prediction block in LM prediction mode. In some examples, the video encoder or the video decoder may be configured to not fetch certain neighboring luma samples as part of the downsampling for constructing the chroma prediction block in LM prediction mode. By not fetching certain neighboring luma samples, the example techniques may promote efficient processing and memory bandwidth usage.

In one example, the disclosure describes a method of decoding video data, the method comprising determining a luma block that corresponds to a chroma block, fetching neighboring luma samples for downsampling the neighboring luma samples, wherein the fetched neighboring luma samples comprise a plurality of luma samples that are above the luma block and exclude luma samples that are above and left of a top-left luma sample of the luma block, determining a plurality of downsampled luma samples based on the fetched neighboring luma samples, wherein one of the downsampled luma samples corresponds to a downsampled luma sample immediately above the top-left luma sample, determining one or more scaling parameters based on the downsampled luma samples, determining a predictive block based on the one or more scaling parameters, and linear model (LM) prediction decoding the chroma block based on the predictive block.

In one example, the disclosure describes a device for decoding video data, the device comprising a video data memory, and a video decoder comprising at least one of fixed-function circuitry or programmable circuitry. The video decoder is configured to determine a luma block that corresponds to a chroma block, fetch, from the video data memory, neighboring luma samples for downsampling the neighboring luma samples, wherein the fetched neighboring luma samples comprise a plurality of luma samples that are above the luma block and exclude luma samples that are above and left of a top-left luma sample of the luma block, determine a plurality of downsampled luma samples based on the fetched neighboring luma samples, wherein one of the downsampled luma samples corresponds to a downsampled luma sample immediately above the top-left luma sample, determine one or more scaling parameters based on the downsampled luma samples, determine a predictive block based on the one or more scaling parameters, and linear model (LM) prediction decode the chroma block based on the predictive block.

In one example, the disclosure describes a method of encoding video data, the method comprising determining a luma block that corresponds to a chroma block, fetching neighboring luma samples for downsampling the neighboring luma samples, wherein the fetched neighboring luma samples comprise a plurality of luma samples that are above the luma block and exclude luma samples that are above and left of a top-left luma sample of the luma block, determining a plurality of downsampled luma samples based on the fetched neighboring luma samples, wherein one of the downsampled luma samples corresponds to a downsampled luma sample immediately above the top-left luma sample, determining one or more scaling parameters based on the downsampled luma samples, determining a predictive block based on the one or more scaling parameters, and linear model (LM) prediction encoding the chroma block based on the predictive block.

In one example, the disclosure describes a device for encoding video data, the device comprising a video data memory, and a video encoder comprising at least one of fixed-function circuitry or programmable circuitry. The video encoder is configured to determine a luma block that corresponds to a chroma block, fetch, from the video data memory, neighboring luma samples for downsampling the neighboring luma samples, wherein the fetched neighboring luma samples comprise a plurality of luma samples that are above the luma block and exclude luma samples that are above and left of a top-left luma sample of the luma block, determine a plurality of downsampled luma samples based on the determined neighboring luma samples, wherein one of the downsampled luma samples corresponds to a downsampled luma sample immediately above the top-left luma sample, determine one or more scaling parameters based on the downsampled luma samples, determine a predictive block based on the one or more scaling parameters, and linear model (LM) prediction encode the chroma block based on the predictive block.

In one example, the disclosure describes a method of decoding video data, the method comprising determining a luma block that corresponds to a chroma block, fetching neighboring luma samples for downsampling the neighboring luma samples, wherein the fetched neighboring luma samples comprise a plurality of luma samples that are left of the luma block and exclude luma samples that are more than a threshold number of samples left of the luma block and below a top-left luma sample of the luma block, determining a plurality of downsampled luma samples based on the fetched neighboring luma samples, wherein one of the downsampled luma samples corresponds to a downsampled luma sample that is the threshold number of samples left of the luma block, determining one or more scaling parameters based on the downsampled luma samples, determining a predictive block based on the one or more scaling parameters; and linear model (LM) prediction decoding the chroma block based on the predictive block.

In one example, the disclosure describes a device for decoding video data, the device comprising a video data memory, and a video decoder comprising at least one of fixed-function circuitry or programmable circuitry. The video decoder is configured to determine a luma block that corresponds to a chroma block, fetch neighboring luma samples for downsampling the neighboring luma samples, wherein the fetched neighboring luma samples comprise a plurality of luma samples that are left of the luma block and exclude luma samples that are more than a threshold number of samples left of the luma block and below a top-left luma sample of the luma block, determine a plurality of downsampled luma samples based on the fetched neighboring luma samples, wherein one of the downsampled luma samples corresponds to a downsampled luma sample that is the threshold number of samples left of the luma block, determine one or more scaling parameters based on the downsampled luma samples, determine a predictive block based on the one or more scaling parameters, and linear model (LM) prediction decode the chroma block based on the predictive block.

In one example, the disclosure describes a method of encoding video data, the method comprising determining a luma block that corresponds to a chroma block, fetching neighboring luma samples for downsampling the neighboring luma samples, wherein the fetched neighboring luma samples comprise a plurality of luma samples that are left of the luma block and exclude luma samples that are more than a threshold number of samples left of the luma block and below a top-left luma sample of the luma block, determining a plurality of downsampled luma samples based on the fetched neighboring luma samples, wherein one of the downsampled luma samples corresponds to a downsampled luma sample that is the threshold number of samples left of the luma block, determining one or more scaling parameters based on the downsampled luma samples, determining a predictive block based on the one or more scaling parameters, and linear model (LM) prediction encoding the chroma block based on the predictive block.

In one example, the disclosure describes a device for encoding video data, the device comprising a video data memory, and a video encoder comprising at least one of fixed-function circuitry or programmable circuitry. The video encoder is configured to determine a luma block that corresponds to a chroma block, fetch neighboring luma samples for downsampling the neighboring luma samples, wherein the fetched neighboring luma samples comprise a plurality of luma samples that are left of the luma block and exclude luma samples that are more than a threshold number of samples left of the luma block and below a top-left luma sample of the luma block, determine a plurality of downsampled luma samples based on the fetched neighboring luma samples, wherein one of the downsampled luma samples corresponds to a downsampled luma sample that is the threshold number of samples left of the luma block, determine one or more scaling parameters based on the downsampled luma samples, determine a predictive block based on the one or more scaling parameters, and linear model (LM) prediction encode the chroma block based on the predictive block.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
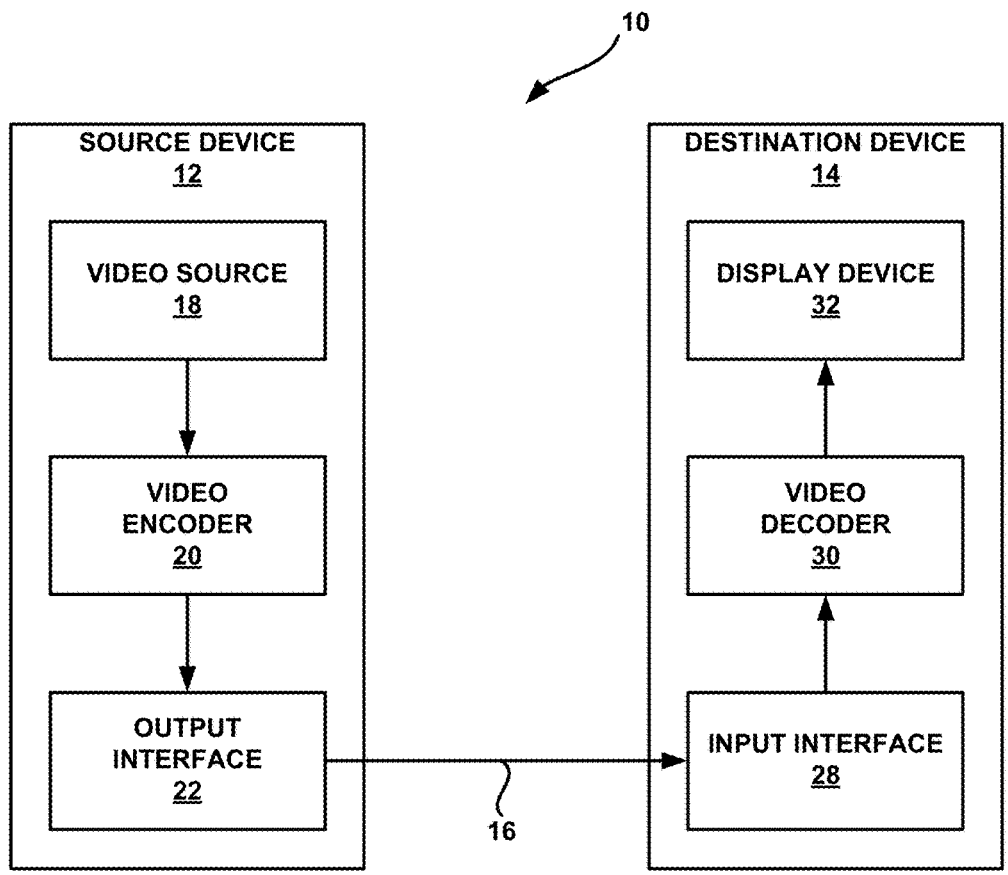
FIG. 1 is a block diagram illustrating an example video coding system that may utilize the techniques described in this disclosure.

This disclosure describes techniques for video coding and compression. In particular, this disclosure describes techniques for linear-model (LM) prediction video coding mode. In the LM prediction video coding mode, a chroma block is predicted from a scaled, downsampled, reconstructed corresponding luma block (i.e., this scaled, downsampled, reconstructed corresponding luma block forms a predictive block used for predicting the chroma block).

In some examples, the downsampling of the reconstructed corresponding luma block includes filtering. This disclosure describes example ways in which to perform such filtering. Moreover, the techniques described in this disclosure may also apply for situations where luma samples used in LM prediction mode are located in different tiles.

Accordingly, the techniques described in this disclosure are related to a Linear Model (LM) prediction mode, which is used to reduce the inter component redundancy in video coding. The techniques described in this disclosure may be used in the context of advanced video codecs, such as extensions of the high efficiency video coding (HEVC) video coding standard or the next generation of video coding standards.

In performing LM prediction encoding or decoding, a video encoder or video decoder, respectively, fetch neighboring luma samples from video data memory for downsampling to determine scaling parameters used to scale a downsampled corresponding luma block. If a filter type used to downsample the neighboring luma samples uses neighboring luma samples that are outside the range of neighboring luma samples that are locally stored (e.g., in local memory of coding circuitry) processing time and memory bandwidth may be wasted by the video encoder or video decoder retrieving luma samples from an external memory. For instance, in the technology of video coding, rather than generic video coding, there may be issues where performing LM prediction mode operations require fetching luma sample values from memory that may require additional processing time and memory bandwidth. This disclosure describes examples to reduce the number of sample values that are fetched that would require relatively high amounts of processing time and memory bandwidth.

As an example, in fetching neighboring luma samples for performing downsampling, the video encoder and video decoder may exclude certain luma samples (e.g., luma samples not stored in local memory or luma samples that are not yet generated) from the fetching. In this manner, in an example, the fetching does not cause the video encoder and the video decoder to access non-local memory. Rather, in this example, the video encoder or video decoder only fetch luma samples from local memory, e.g., for use in LM prediction mode operations.

In some examples, the video encoder and the video decoder may be configured to perform downsampling using different filters. For example, the video encoder and video decoder may apply a first filter when none of the neighboring luma samples that are excluded are needed for downsampling in accordance with the first filter. However, if applying the first filter would require the fetching the excluded luma samples, then the video encoder and the video decoder may apply a second filter that is different than the first filter.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Video encoder 20 and video decoder 30 of video coding system 10 represent examples of devices that may be configured to perform techniques for linear model (LM) prediction-based video coding in accordance with various examples described in this disclosure. For example, video encoder 20 and video decoder 30 may be configured to code a chroma block utilizing scaled, downsampled, reconstructed luma samples of a corresponding luma block, as described in this disclosure.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

Video coding system 10 illustrated in FIG. 1 is merely an example and the techniques of this disclosure may apply to video coding settings (e.g., video encoding or video decoding) that do not necessarily include any data communication between the encoding and decoding devices. In some examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device (e.g., a video camera), a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented by one or more processors formed by any of a variety of suitable processing circuitry (e.g., fixed-function and/or programmable circuitry), such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" or "transmitting" certain information to another device, such as video decoder 30. The term "signaling" or "transmitting" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard. Examples video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions.

In addition, a new video coding standard, namely High Efficiency Video Coding (HEVC), has recently been developed by the Joint Collaboration Team on Video Coding (JCT-VC) of ITU-T Video Coding Experts Group (VCEG) and ISO/IEC Motion Picture Experts Group (MPEG). An HEVC draft specification, referred to as HEVC WD hereinafter, is available from http://phenix.int-evry.fr/jct/doc_en-d_user/documents/14_Vienna/wg11/JCTVC-N1003-v1.zip. The HEVC standard is also presented jointly in Recommendation ITU-T H.265 and International Standard ISO/IEC 23008-2, both entitled "High efficiency video coding," and both published October, 2014.

The specification of HEVC and its extensions including Format Range (RExt), Scalability (SHVC), and Multi-View (MV-HEVC) Extensions is available from http://phenix.int-evry.fr/jct/doc_end_user/documents/18_Sapporo/wg11/JCTVC-R1013-v6.zip.

Video coding may be performed based on color space and color format. For example, color video plays an essential role in multimedia systems, where various color spaces are used to efficiently represent color. A color space specifies color with numerical values using multiple components. A popular color space is the RGB color space, where color is represented as a combination of three primary color component values (i.e., red, green and blue). For color video compression, the YCbCr color space has been widely used, as described in A. Ford and A. Roberts, "Colour space conversions," University of Westminster, London, Tech. Rep., August 1998.

YCbCr can be easily converted from RGB color space via a linear transformation and the redundancy between different components, namely the cross component redundancy, is significantly reduced in the YCbCr color space. One advantage of YCbCr is the backward compatibility with black and white TV as Y signal conveys the luminance information. In addition, chrominance bandwidth can be reduced by sub-sampling the Cb and Cr components in 4:2:0 chroma sampling format with significantly less subjective impact than subsampling in RGB. Because of these advantages, YCbCr has been the major color space in video compression. There are also other color spaces, such as YCoCg, used in video compression. In this disclosure, regardless of the actual color space used, the Y, Cb, Cr is used to represent the three color components in the video compression scheme.

Figure 4:
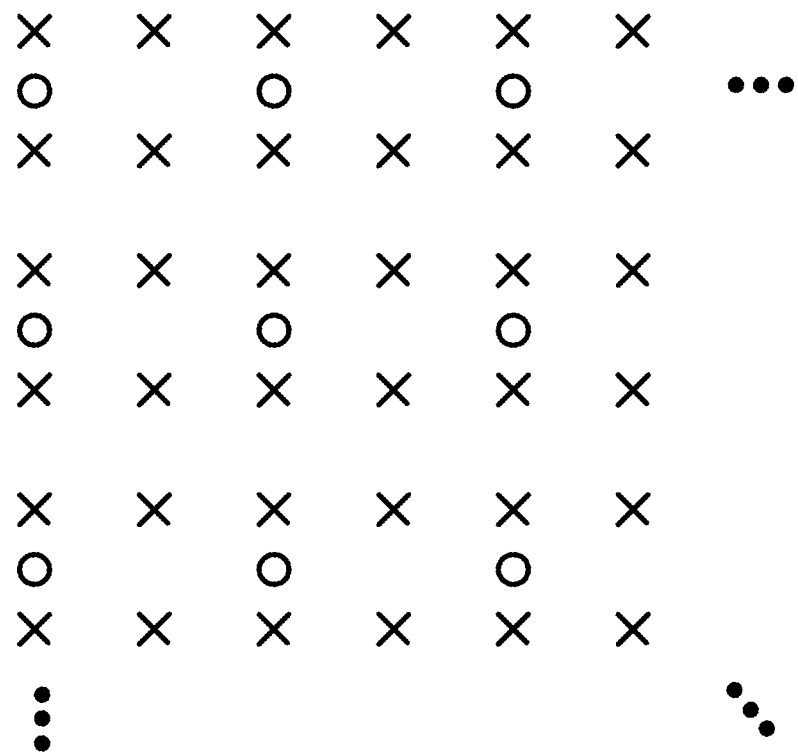
FIG. 4 is a conceptual diagram illustrating nominal vertical and horizontal relative locations of luma and chroma samples.

In 4:2:0 sampling, each of the two chroma arrays has half the height and half the width of the luma array. The nominal vertical and horizontal relative locations of luma and chroma samples in pictures are shown in FIG. 4.

In HEVC and other video coding standards, a video sequence typically includes a series of pictures. Pictures may also be referred to as "frames." A picture may include three sample arrays, denoted SL, Scb and Scr. SL is a two-dimensional array (i.e., a block) of luma samples. Scb is a two-dimensional array of Cb chrominance samples. Scr is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in the raster scan.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. Video encoder 20 may generate predictive luma, Cb and Cr blocks for luma, Cb and Cr prediction blocks of each PU of the CU.

Video encoder 20 may use intra prediction, inter prediction, or linear model (LM)-prediction, as a few examples, to generate (e.g., determine) the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate (e.g., determine) the predictive blocks of a PU, video encoder 20 may generate the predictive blocks of the PU based on decoded samples of one or more pictures other than the picture associated with the PU. Video encoder 20 may use uni-prediction or bi-prediction to generate the predictive blocks of a PU. When video encoder 20 uses uni-prediction to generate the predictive blocks for a PU, the PU may have a single motion vector (MV). When video encoder 20 uses bi-prediction to generate the predictive blocks for a PU, the PU may have two MVs.

After video encoder 20 generates predictive luma, Cb and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

For a chroma block, rather than determining a predictive block for intra- or inter-prediction, video encoder 20 may determine a predictive block based on a reconstructed, corresponding luma block, for LM prediction mode. Video decoder 30 may similarly determine a predictive block based on a reconstructed corresponding luma block. The corresponding luma block refers to the luma block that was part of the unit (e.g., coding unit or prediction unit) from which the current chroma block was determined. Video encoder 20 may determine the residual between the chroma block and this predictive block generated from a reconstructed corresponding luma block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream.

Video encoder 20 may output a bitstream that includes the entropy-encoded syntax elements. The bitstream may include an encoded representation of video data. For instance, the bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for supplemental enhancement information (SEI), and so on. NAL units that encapsulate RBSPs for video coding data (as opposed to RBSPs for parameter sets and SEI messages) may be referred to as video coding layer (VCL) NAL units.

Video decoder 30 may receive a bitstream generated by video encoder 20. In addition, video decoder 30 may parse the bitstream to decode syntax elements from the bitstream. Video decoder 30 may reconstruct the pictures of the video data based at least in part on the syntax elements decoded from the bitstream. The process to reconstruct the video data may be generally reciprocal to the process performed by video encoder 20. For instance, video decoder 30 may use MVs of PUs to determine predictive blocks for the PUs of a current CU. As another example, for LM prediction mode, video decoder 30 may determine the predictive block for a chroma block based on reconstructed samples of a corresponding luma block. In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU.

Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

In some examples, video encoder 20 and video decoder 30 may be configured to perform linear model (LM)-based coding. The following is a description of the LM-based prediction coding. For example, although the cross complement redundancy is significantly reduced in YCbCr color space, correlation between three color components still exists. Various methods have been studied to improve the video coding performance by further reducing the correlation.

In 4:2:0 chroma video coding, a method named Linear Model (LM) prediction mode has been well studied, during development of HEVC standard. See J. Chen, V. Seregin, W.-J. Han, J.-S. Kim, B.-M. Joen, "CE6.a.4: Chroma intra prediction by reconstructed luma samples", Joint Collaborative Team on Video Coding (JCT-VC) of ITU-T SG16 WP3 and ISO/IEC JTC1/SC29/WG11, JCTVC-E266, 5th Meeting: Geneva, 16-23 March, 2011, available from http://phenix.int-evry.fr/jct/doc_end_user/current_document.php?id=2196, and referred as JCTVC-E266 hereafter.

With LM prediction mode, the chroma samples are predicted based on reconstructed luma samples of the same block by using a linear model as follows:

$$\text{pred}_C(i,j) = \alpha \cdot \text{rec}_L(i,j) + \beta \quad (1)$$

where $\text{pred}_C(i,j)$ represents the prediction of chroma samples in a block and $\text{rec}_L(i,j)$ represents the downsampled reconstructed luma samples of the same block. Parameters $\alpha$ and $\beta$ are derived from causal reconstructed samples around the current block (e.g., neighboring luma samples). Denote the chroma block size by N×N; then both i and j are within the range [0, N).

Parameters $\alpha$ and $\beta$ in equation (1) are derived by minimizing regression error between the neighboring reconstructed luma and chroma samples around the current block.

$$E(\alpha, \beta) = \sum_i (y_i - (\alpha \cdot x_i + \beta))^2 \quad (2)$$

The parameters $\alpha$ and $\beta$ are solved as follows:

$$\alpha = \frac{I \sum x_i \cdot y_i - \sum x_i \cdot y_i}{I \sum x_i \cdot x_i - \sum x_i \cdot \sum x_i} \quad (3)$$

$$\beta = \left(\sum y_i - \alpha \cdot \sum x_i\right) / I \quad (4)$$

where $x_i$ is downsampled reconstructed Luma reference sample, $y_i$ is reconstructed Chroma reference samples, and I is an amount (e.g., number) of the reference samples. For a target N×N chroma block, when both left and above causal samples are available, the total involved samples number I is equal to 2N; when only left or above causal samples are available, the total involved samples number I is equal to N.

Figure 5:
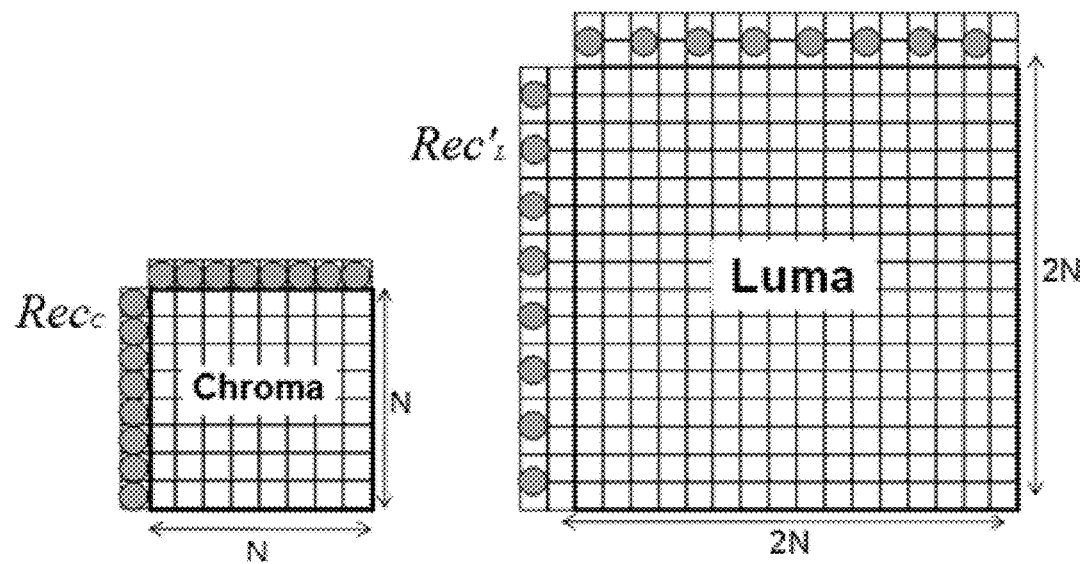
FIG. 5 is a conceptual diagram illustrating example locations from which scaling parameters used to scale the downsampled, reconstructed luma block are derived.

FIG. 5 is a conceptual diagram illustrating example locations from which scaling parameters used to scale the downsampled, reconstructed luma block are derived. For example, FIG. 5 illustrates an example of 4:2:0 sampling, and the scaling parameters are α and β.

In general, when LM prediction mode is applied, video encoder 20 and video decoder 30 may invoke the following steps. Video encoder 20 and video decoder 30 may downsample the neighboring luma samples. Video encoder 20 and video decoder 30 may derive the linear parameters (i.e., α and β) (also referred to as scaling parameters). Video encoder 20 and video decoder 30 may downsample the current luma block and derive the prediction (e.g., predictive block) from the downsampled luma block and linear parameters (i.e., scaling parameters).

There may be various ways in which to downsample. The following describes example ways in which downsampling may be performed.

In JCTVC-E266, as described above, when performing LM prediction mode, the downsampled current luma block and downsampled neighboring luma block are required. The downsampled current luma block is used to derive the prediction block for chroma coding while the downsampled neighboring luma block is used for parameters (i.e., α and β) derivation.

Since the typical sampling ratio of chroma components is half of that of the luma component and has 0.5 sample phase difference in the vertical direction in 4:2:0 sampling, the reconstructed luma of a current block is downsampled in the vertical direction and subsampled in the horizontal direction to match the size and phase of the chroma signal, as follows:

$$rec_L(i,j)=(Rec_{LOrig}[2i,2j]+Rec_{LOrig}[2i,2j+1])>>1 \quad (5)$$

wherein $Rec_{LOrig}[\ ]$ indicates the original reconstructed luma sample.

Figure 6:
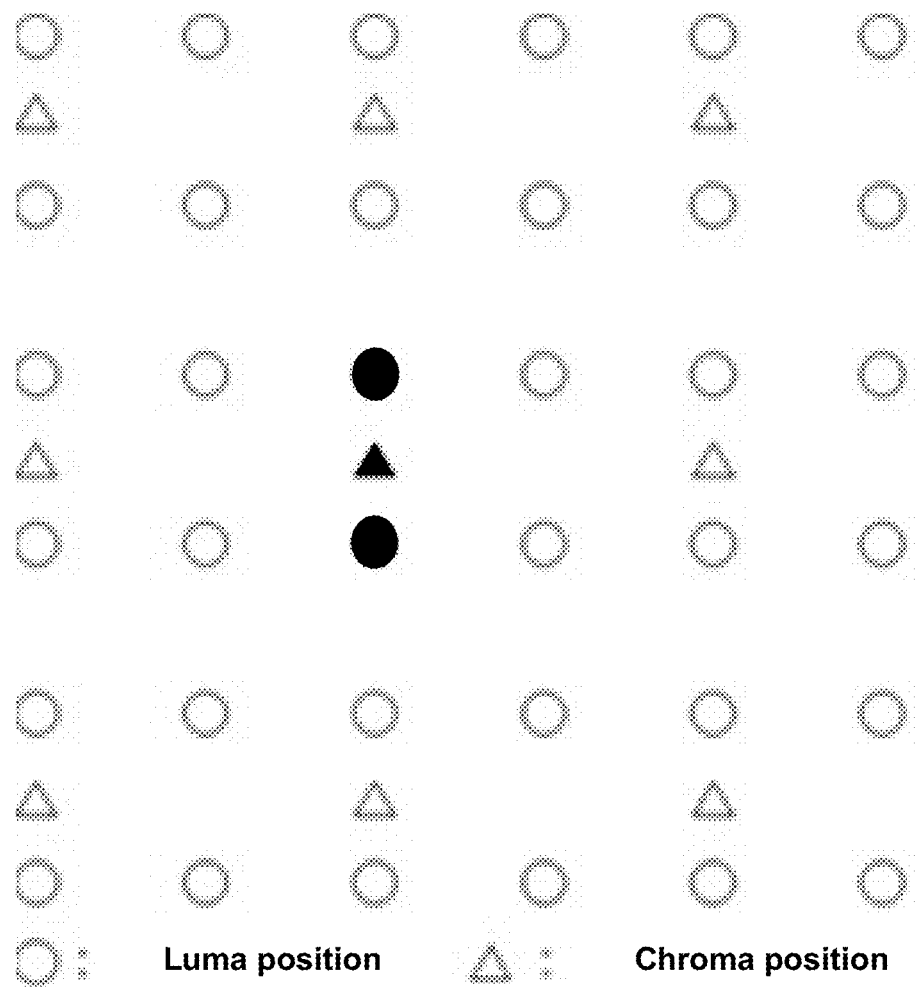
FIG. 6 is a conceptual diagram illustrating an example of luma positions and chroma positions for downsampling samples of a luma block for generating a predictive block.

FIG. 6 is a conceptual diagram illustrating an example of luma positions and chroma positions for downsampling samples of a luma block for generating a predictive block for a chroma block. As depicted in FIG. 6, a chroma sample, represented by the filled-in (i.e., solid black) triangle, is predicted from two luma samples, represented by the two filled-in circles, by applying a [1, 1] filter. The [1, 1] filter is one example of a 2-tap filter.

For the downsampling of neighboring luma block, when the neighboring samples are on top of the current luma block, the downsampling process is defined as:

$$rec_L(-1,j)=Rec_{LOrig}[2i,-1] \quad (6)$$

When the neighboring samples are on the left of the current luma block, the downsampling process is defined as:

$$rec_L(-1,j)=(Rec_{LOrig}[-2,2j]+Rec_{LOrig}[-2,2j+1])>>1 \quad (7)$$

The 2-tap filter, i.e., [1, 1], may be the same as what has been used in the example illustrated in FIG. 6.

Other downsampling techniques have also been proposed. In Yi-Jen Chiu, Yu Han, Lidong Xu, Wenhao Zhang, Hong Jiang, "Cross-channel techniques to improve intra chroma prediction," Joint Collaborative Team on Video Coding (JCT-VC) of ITU-T SG16 WP3 and ISO/IEC JTC1/SC29/WG11, JCTVC-F502, 6th Meeting: Torino, IT, 14-22 Jul. 2011, available from http://phenix.int-evry.fr/jct/doc_end_user/current_document.php?id=2979, and referred to as JCTVC-F502, instead of using the two-tap filter, the 2-dimensional 6-tap filtering is applied to both the current luma block and the neighboring luma block. The 2-dimensional filter coefficient set is:

$$\begin{bmatrix} 1 & 2 & 1 \\ 1 & 2 & 1 \end{bmatrix}/8 \quad (8)$$

In other words, the downsampled luma samples are derived by the following equation (9):

$$rec_L(i,j)=(Rec_{LOrig}[2i,2j]*2+Rec_{LOrig}[2i,2j+1]+Rec_{LOrig}[2i,2j-1]+Rec_{LOrig}[2i+1,2j]*2+Rec_{LOrig}[2i+1,2j+1]+Rec_{LOrig}[2i+1,2j-1])>>3. \quad (9)$$

Figure 7:
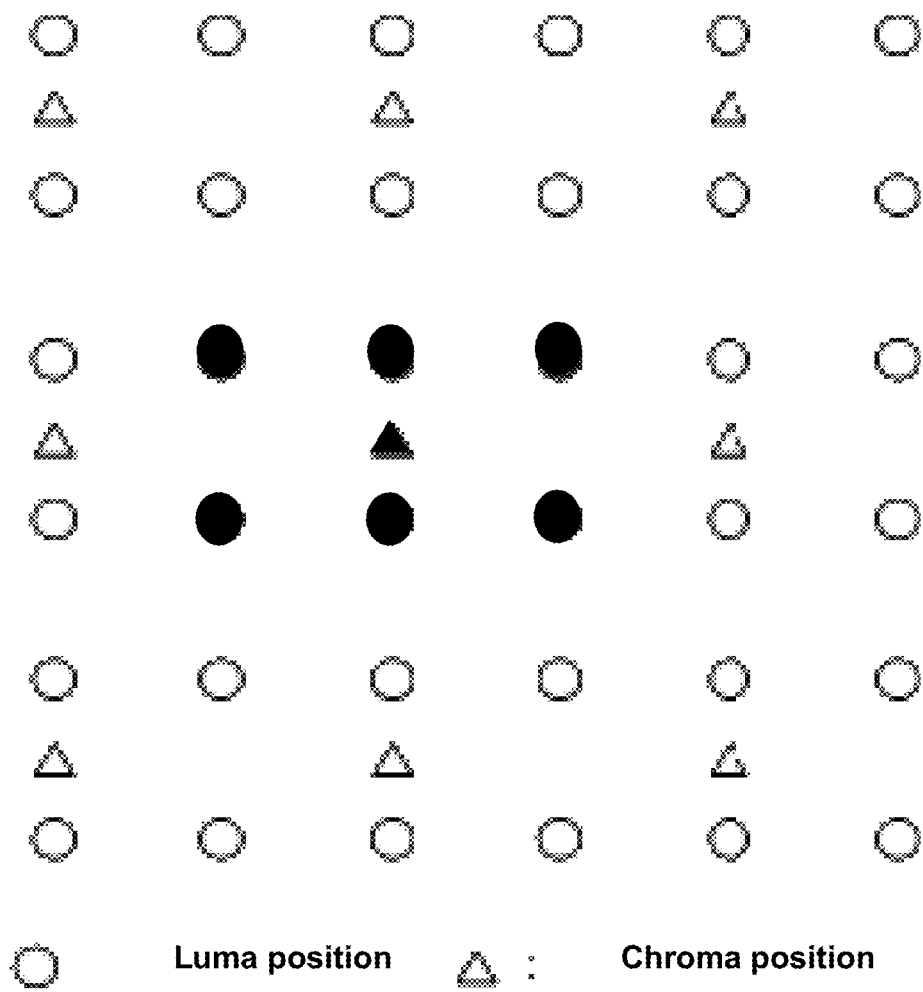
FIG. 7 is a conceptual diagram illustrating another example of luma positions and chroma positions for downsampling samples of a luma block for generating a predictive block.
Figure 8A:
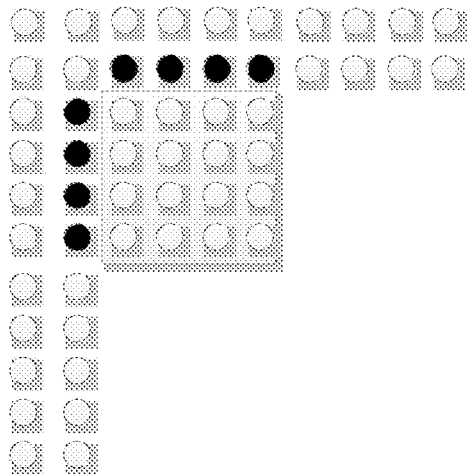
FIGS. 8A-8D are conceptual diagrams illustrating neighboring samples used in downsampling.
Figure 8B:
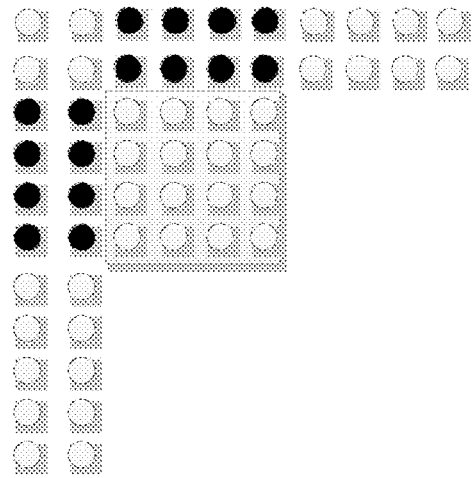
Figure 8C:
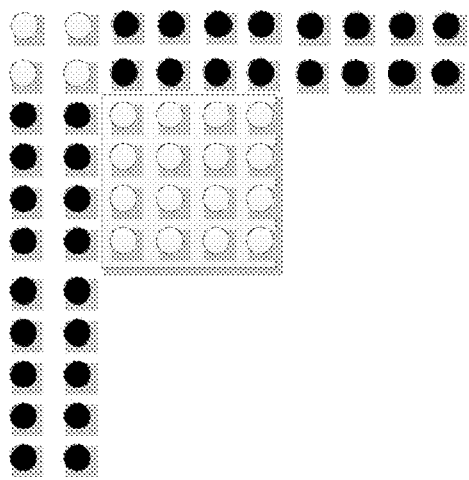
Figure 8D:
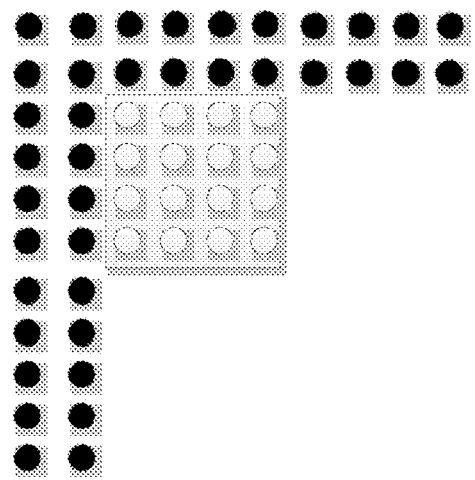

FIG. 7 is a conceptual diagram illustrating another example of luma positions and chroma positions for downsampling samples of a luma block for generating a predictive block. As depicted in FIG. 7, a chroma sample, represented by the filled in (i.e., solid black) triangle, is predicted from six luma samples, represented by the six filled in circles, by applying a 6-tap filter.

Since the predictor of one chroma sample is derived using the linear function, as defined in formula (1), it could be seen that when 6-tap filter is applied, the predictor of one chroma sample relies on the six neighboring luma samples. When combining equations (1) and (9), the result is the following equation (10):

$$pred_C(i, j) = \quad (10)$$
$$\alpha \cdot (Rec_{LOrig}[2i, 2j]*2 + Rec_{LOrig}[2i, 2j+1] + Rec_{LOrig}[2i, 2j-1] + Rec_{LOrig}[2i+1, 2j]*2 + Rec_{LOrig}[2i+1, 2j+1] + Rec_{LOrig}[2i+1, 2j-1]) >> 3) + \beta$$

In the following text, the downsampled sample $rec_L(i, j)$ is named as the corresponding downsampled luma sample for the chroma sample located at (i, j).

In U.S. Provisional Application No. 62/395,145, filed Sep. 15, 2016 ('145 Application hereafter), and U.S. application Ser. No. 15/705,029, filed Sep. 14, 2017 ('029 Application hereafter), more downsampling filters are described, and more neighboring samples can be used to derive the linear-models as shown in FIGS. 8A-8D. In general, FIGS. 8A-8D are conceptual diagrams illustrating neighboring samples used for downsampling. In FIGS. 8A-8D, the filled in circles are examples of neighboring chroma samples. Their corresponding luma samples may be downsampled as part of downsampling neighboring luma samples to determine the scaling parameters.

The following describes signaling in LM mode. In JCTVC-E266 and JCTVC-F502 (both cited above), a flag is signaled to indicate whether LM prediction is used for the current block. The '145 Application and '029 Application describe more LM prediction modes, and a more sophisticated signaling method may be described. LM modes and a Non-LM mode are organized in an ordered list. The order of modes depends on the chroma intra-prediction modes of neighboring blocks. The index of the coded chroma intra-prediction mode in the ordered list of the current block is signaled by video encoder 20.

There may be issues with some of example techniques. The following describe some of these possible issues. The downsampling process invoked in the LM prediction mode proposed in JCTVC-F502 may be more efficient, but it accesses more neighboring blocks (e.g., neighboring luma samples), which may increase the line-buffer cost in the hardware design. The signaling method proposed in the '145 Application and '029 Application may improve the coding performance. The example techniques in the '145 Application and '029 Application may also include overhead of reordering the mode list. Also, the example techniques in the '145 Application and '029 Application may increase the line-buffer cost by accessing more neighboring blocks (e.g., neighboring luma samples).

Accordingly, there may be technological issues present in some techniques for downsampling neighboring luma samples. Video encoder 20 and video decoder 30 each include respective line-buffers that are local to respective ones of video encoder 20 and video decoder 30. For example, processing circuitry of video encoder 20 may not need a system bus external to video encoder 20 to access the line-buffer of video encoder 20, and processing circuitry of video decoder 30 may not need a system bus external to video decoder 30 to access the line-buffer of video decoder 30. The line-buffer of video encoder 20 may be in the same integrated circuit (IC) chip as video encoder 20, and the line buffer of video decoder 30 may be in the same IC chip as video decoder 30. Video encoder 20 and video decoder 30 may be able to fetch data stored in respective line-buffers in a relatively short amount of time because the availability of accessing the line-buffer is not delayed due to some other component accessing the line-buffer (e.g., the respective line-buffers may not be used by components other than video encoder 20 and video decoder 30).

For example, of all of the components that may be present on the IC that includes video encoder 20 or the IC that includes video decoder 30, only video encoder 20 or video decoder 30, or a limited number of components of the IC, may access the line-buffer. There may be memory on the IC that includes video encoder 20 or video decoder 30. However, this memory may be accessible by all of the components on the IC. The line-buffer, in some but not necessarily all examples, may be different than the memory available to all components on the IC, and may be available to video encoder 20 or video decoder 30 (as applicable) and no other components or a limited number of components on the IC. The various components of the IC may access this memory via a system bus, but accessing the line-buffer may not require video encoder 20 or video decoder 30 to use the same system bus.

In some examples, the line-buffer, such as on video decoder 30, may provide a relatively small amount of storage space. For instance, a line-buffer may store a limited number of luma and chroma sample values, and may not provide sufficient storage to store an entire picture of luma and chroma samples values. The line-buffer for video decoder 30 may store reconstructed luma and chroma sample values such as luma and chroma sample values that are proximate to (e.g., neighbor) a current block being encoded or decoded. If video decoder 30 is to fetch sample values from its line-buffer, video decoder 30 may be able to fetch the sample values relatively quickly and with low power usage. However, if video decoder 30 is to fetch sample values not stored within its line-buffer, video decoder 30 may expend power and time accessing system memory external to video decoder 30 to retrieve sample values. Accordingly, there may be technical advantages to limiting access of video decoder 30 to memory other than the line-buffer memory when possible.

The line-buffer memory of video encoder 20 may not necessarily be limited to a relatively small amount of storage space. However, because video decoder 30 performs the inverse operations of video encoder 20, if video encoder 20 relies on sample values for downsampling that would be outside the line-buffer of video decoder 30, there may be an impact on how quickly video decoder 30 is able to reconstruct blocks of a picture.

The above description of the line-buffer is provided to assist with understanding, and should not be considered limiting. The example techniques described in this disclosure may be applicable to examples where larger line-buffer memory is used, or where no line-buffer memory is used. For ease, in FIGS. 2 and 3, reference is made to a video data memory, and an example of the video data memory is a line-buffer. However, the video data memory may be different than the line-buffer.

As described in more detail, in one or more example techniques, for downsampling neighboring luma samples for LM prediction mode, video encoder 20 and video decoder 30 may utilize downsampling filtering techniques that exclude neighboring luma samples that are stored external to the line-buffer. In some examples, if the luma samples used to downsample neighboring luma samples for determining the scaling parameters are stored within the line-buffer, then video encoder 20 and video decoder 30 may perform a downsampling in accordance with a first filter. However, if the luma samples used to downsample neighboring luma samples for determining the scaling parameters are not stored within the line-buffer, then video encoder 20 and video decoder 30 may perform a downsampling in accordance with a second filter. The second filter may be different than the first filter. In some examples, if the luma samples used to downsample neighboring luma samples for determining the scaling parameters are not stored within the line-buffer, then video encoder 20 and video decoder 30 may perform a downsampling in accordance with the first filter, but generate luma sample values for values not stored in the line-buffer, rather than fetch those luma sample values from memory external to video encoder 20 or video decoder 30.

The following describes techniques in accordance with this disclosure. The example techniques may address the problems mentioned above, but need not necessarily address the problems mentioned above. The itemized techniques may apply individually. Alternatively, any combination of them may apply.

In the example techniques, the coordinate (position) of the left-top luma sample of the current block is denoted by (x0, y0). The example techniques are described with excluding luma samples from luma samples whose values are fetched for downsampling. For ease, the luma samples that are excluded are described with respect to the top-left luma sample of the current block.

During the derivation process of corresponding downsampled luma samples for a chroma sample, the fetched luma samples are restricted to a given area depending on the position of the chroma sample. As one example, during the derivation process of corresponding downsampled luma samples of chroma samples, a luma sample with coordinate (x,y), where x<x0 and y<y0, is not involved in the downsampling process of above neighboring luma samples of the current block. For example, in fetching neighboring luma samples for downsampling the neighboring luma samples, video encoder 20 and video decoder 30 may exclude luma samples that are above and left of the top-left luma sample of the luma block, and fetch luma samples that are above the luma block.

Figure 9:
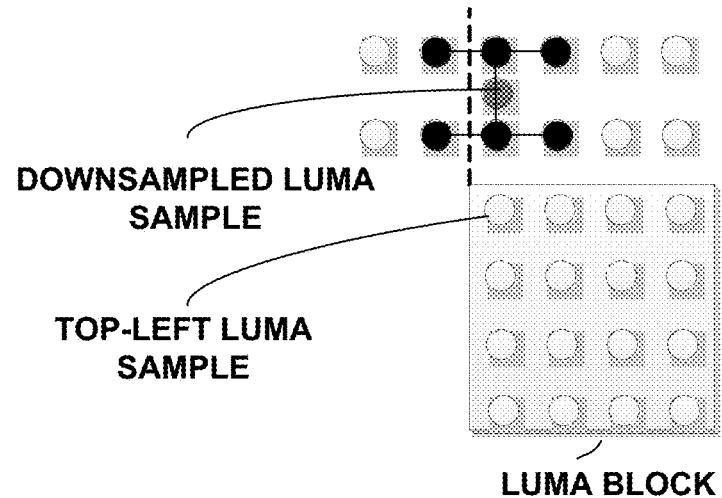
FIG. 9 is a conceptual diagram illustrating an example of luma samples that are fetched to get a downsampled luma sample.
Figure 10:
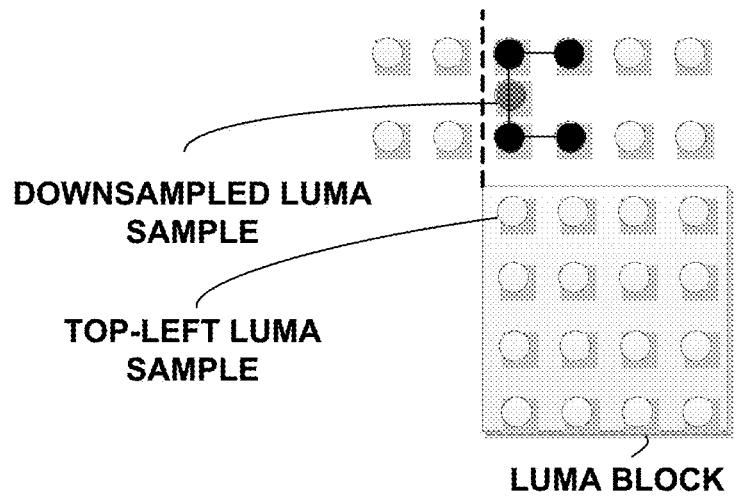
FIG. 10 is a conceptual diagram illustrating an example of luma samples that are fetched to get a downsampled luma sample.

FIG. 9 is a conceptual diagram illustrating an example of luma samples that are fetched to get a downsampled luma sample. FIG. 10 is a conceptual diagram illustrating an example of luma samples that are fetched to get a downsampled luma sample. FIG. 9 and FIG. 10 demonstrate the difference between the downsampling methods in JCTVC-F502 (FIG. 9) and the techniques described in this disclosure (FIG. 10). To get the left-most above downsampled neighboring luma sample, JCTVC-F502 describes that a process will fetch two luma samples above left to the current block; while video encoder 20 and video decoder 30 may not fetch these two luma samples in accordance with the example techniques described in this disclosure.

In one example, the length of the filter (i.e., number of samples that the filter extends over) for deriving the corresponding downsampled luma sample of a chroma sample is shorter when the filtering process will involve luma samples with coordinate (x,y), where x<x0 and y<y0. In other words, video encoder 20 and video decoder 30 may utilize different filters for the downsampling process based on which neighboring luma samples are involved in the downsampling.

Figure 11A:
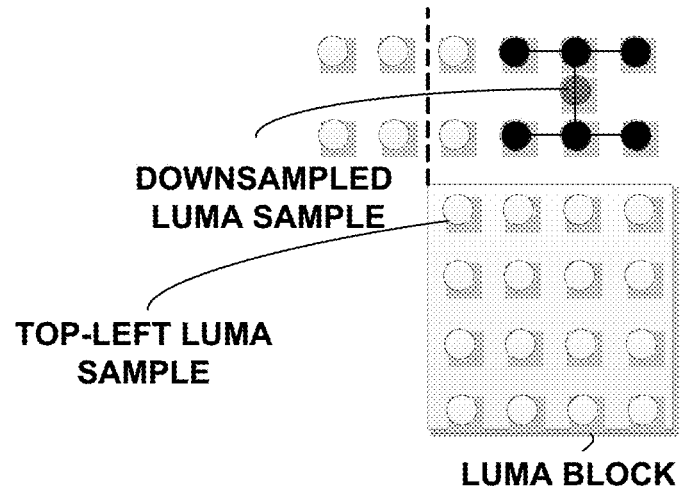
FIGS. 11A and 11B are conceptual diagrams illustrating different filter lengths for downsampled samples at different positions.
Figure 11B:
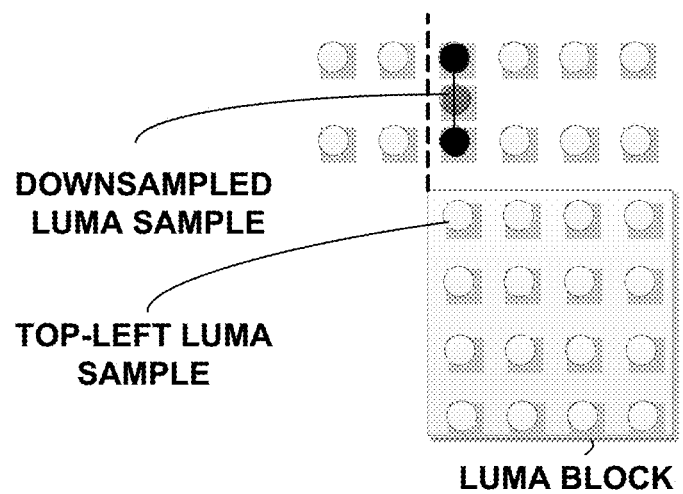

FIGS. 11A and 11B are conceptual diagrams illustrating different filter lengths for down sampled samples at different positions. The downsampling filter proposed in JCTVC-F502 is used when there is no luma sample with coordinate (x,y), where x<x0, y<y0, is involved in the filtering process, as shown in FIG. 11A. On the other hand, the downsampling filter proposed in JCTVC-E266 is used when there are luma samples with coordinate (x,y), where x<x0, y<y0 is involved in the JCTVC-F502 filtering process as shown in FIG. 11B. The values for x0 and y0 may be values for coordinates within the picture, such as coordinates in the certain of the picture.

In one example, the filters for deriving the corresponding downsampled luma sample of a chroma sample are the same, regardless of whether the filtering process involves luma samples with coordinate (x,y), where x<x0 and y<y0 or not. However, when the filtering process involves luma samples with coordinate (x,y), where x<x0 and y<y0, these luma samples are padded by adjacent luma samples instead of being fetched from the corresponding locations.

Figure 12A:
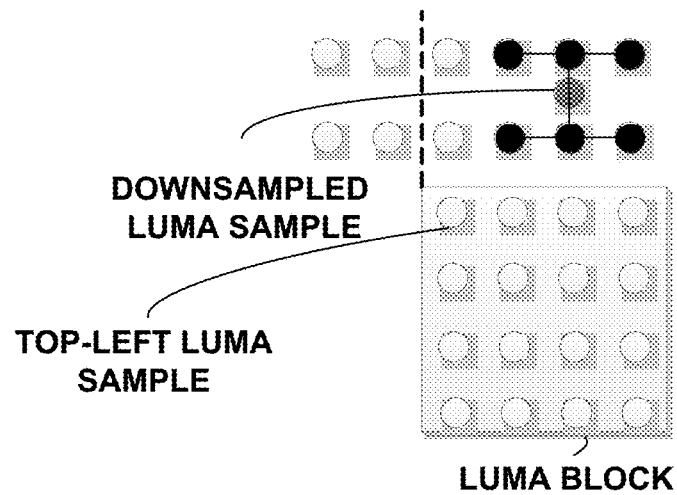
FIGS. 12A and 12B are conceptual diagrams illustrating filtering with padded samples.
Figure 12B:
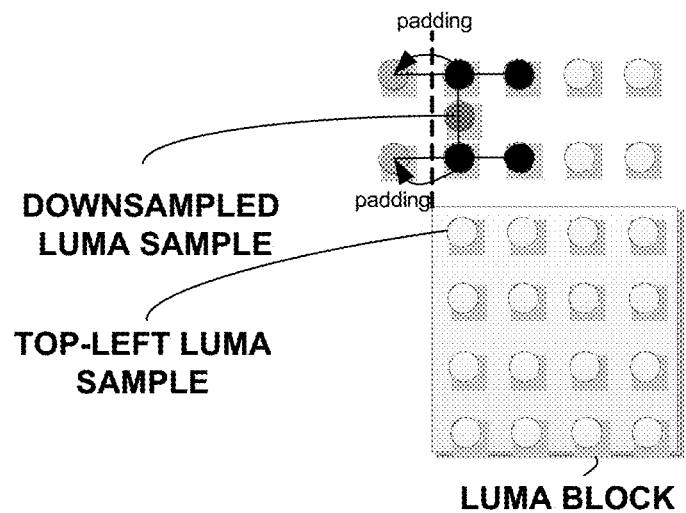

FIGS. 12A and 12B are conceptual diagrams illustrating filtering with padded samples. In FIGS. 12A and 12B, the downsampling filter proposed in JCTVC-F502 is always used, regardless of whether a luma sample with coordinate (x,y), where x<x0 and y<y0, is involved in the filtering process or not. But when luma samples with coordinate (x,y), where x<x0 and y<y0, are involved, these samples are padded instead of being fetched as shown in FIG. 12B. Eq. (11) shows the padding process in a formula way.

$$rec_L(i,j) = (Rec_{LOrig}[2i,2j]*2 + Rec'_{LOrig}[2i-1,2j] + Rec_{LOrig}[2i+1,2j] + Rec_{LOrig}[2i,2j+1]*2 + Rec'_{LOrig}[2i-1,2j+1] + Rec_{LOrig}[2i+1,2j+1]) >> 3$$

where $$Rec'_{LOrig}[2i-1,2j] = Rec_{LOrig}[2i,2j]$$

$$Rec'_{LOrig}[2i-1,2j+1] = Rec_{LOrig}[2i,2j+1] \quad (11)$$

Accordingly, FIGS. 10-12B illustrate examples of which neighboring luma samples video encoder 20 and video decoder 30 fetch for downsampling luma samples. For instance, the fetched neighboring luma samples includes a plurality of luma samples that are above the luma block and exclude luma samples that are above and left of the top-left luma sample of the luma block. Video encoder 20 and video decoder 30 may determine a plurality of downsampled luma samples based on the fetched neighboring luma samples. One of the downsampled luma samples corresponds to a downsampled luma sample immediately above the top-left luma sample.

For example, FIGS. 10, 11B, and 12B illustrate a downsampled luma sample that is immediately above the top-left luma sample. FIGS. 11A and 12A illustrate a downsampled luma sample that is above the luma block but not immediately above the top-left luma sample. Accordingly, FIGS. 10-12B illustrate example ways in which video encoder 20 and video decoder 30 may determine a plurality of downsampled luma samples, where the downsampled luma sample in FIGS. 10, 11B, and 12B is one of the plurality of downsampled luma samples, and the downsampled luma sample in FIGS. 11A and 12A is another one of the plurality of downsampled luma samples.

As illustrated in FIGS. 10, 11B, and 12B, one of the downsampled luma samples corresponds to a downsampled luma sample immediately above the top-left luma sample. The fetched neighboring luma samples that are downsampled to generate the downsampled luma sample of FIGS. 10, 11B, and 12B exclude luma samples that are above and left to a top-left luma sample of the luma block. In contrast, the fetched neighboring luma samples that are downsampled to generate the downsampled luma sample of FIG. 9 includes luma samples that are above and left to a top-left luma sample of the luma block. In some examples, the luma samples that are above and left to a top-left luma sample of the luma block may not be stored in the line-buffer memory. Therefore, accessing these luma samples may be processing- and bandwidth-inefficient. Hence, the example techniques may promote processing and bandwidth efficiency by excluding, from the fetched luma samples, samples that are above and left to a top-left luma sample of the luma block.

However, in some examples, all of the luma samples needed for downsampling in accordance to the filter described in JCTVC-F502 may be stored in the line-buffer and in such examples, video encoder 20 and video decoder 30 may fetch all of the neighboring luma samples needed to perform the downsampling in accordance to the JCTVC-F502 filter. If all of the luma samples needed for downsampling in accordance with the filter of JCTVC-F502 are not available (e.g., because these luma samples are located above and left of the top-left sample), then video encoder 20 and video decoder 30 may fetch different samples than those used in the filter of JCTVC-F502. It should be understood that reference to the filter of JCTVC-F502 is used merely as one example, and the techniques are applicable to other filters as well.

As illustrated in FIG. 11A, video encoder 20 and video decoder 30 may apply a first filter to a first set of the fetched neighboring luma samples, to determine a first downsampled luma sample of the plurality of downsampled luma samples, when no luma samples that are above and left of the top-left luma sample are needed for downsampling in accordance with the first filter. For instance, in FIGS. 11A and 12A, the first filter utilizes three luma samples from a first row that is above the luma block, and utilizes three luma samples from a second row that is above the first row. In FIGS. 11A and 12A, the first set of the fetched neighboring luma samples are the example luma samples utilized to generate the illustrated downsampled luma sample.

As illustrated in FIGS. 10 and 11B, video encoder 20 and video decoder 30 may apply a second filter to a second set of the fetched neighboring luma samples, to determine a second downsampled luma sample of the plurality of downsampled luma samples, when at least one luma sample that is above and left of the top-left luma sample of the luma block is needed for downsampling in accordance with the first filter. It should be understood that when video encoder 20 or video decoder 30 apply the second filter, video encoder 20 and video decoder 30 do not necessarily (although it is possible) determine that use of the first filter would result in fetching at least one luma sample that is above and left of the top-left luma sample. Rather, in the condition where use of the first filter would result in fetching at least one luma sample that is above and left of the top-left luma sample, video encoder 20 and video decoder 30 may utilize a second filter for downsampling that does not require fetching luma samples that are above and left of the top-left luma sample.

For instance, in FIGS. 10 and 11B, if the first filter (e.g., that used in FIG. 11A) were used, then video encoder 20 and video decoder 30 would have needed to fetch luma samples that are above and left of the top-left luma sample. To avoid fetching of luma samples that are above and left of the top-left luma samples, video encoder 20 and video decoder 30 may apply the second filter. In some examples, the second filter utilizes less than three luma samples from a first row that is above the luma block (e.g., two luma samples in FIG. 10 and one luma sample in FIG. 11B), and utilizes less than three luma samples from a second row that is above the first row (e.g., two luma samples in FIG. 10, and one luma sample in FIG. 11B).

In FIGS. 10, 11A, and 11B, video encoder 20 and video decoder 30 may utilize different filters based on whether the fetching of luma sample would result in fetching luma samples that are above and left of the top-left luma sample. However, the example techniques are not so limited.

In some examples, video encoder 20 and video decoder 30 may utilize one filter. In the condition where use of that filter for downsampling would result in video encoder 20 and video decoder 30 fetching luma samples that are above and left of the top-left luma sample, rather than fetching luma samples that are above and left of the top-left luma sample, video encoder 20 and video decoder 30 may generate luma values (e.g., padding values described above). For instance, as illustrated in FIG. 12B, video encoder 20 and video decoder 30 may generate, without fetching, luma values (e.g., padding values) that correspond to luma samples located above and left of the top-left luma sample of the luma block. Video encoder 20 and video decoder 30 may apply a filter (e.g., filter from JCTVC-F502) to the generated luma values to determine at least one downsampled luma sample of the plurality of downsampled luma samples.

The above provided examples for downsampling neighboring luma samples that are above the luma block. The following are examples for downsampling neighboring luma samples that are left of the luma block. The following examples for downsampling the left neighboring luma samples and the above examples for downsampling neighboring luma samples that are above the luma block may be used together or separately.

For example, video encoder 20 and video decoder 30 may be configured to perform one or more example techniques described in this disclosure with respect to downsampling above neighboring luma samples, and may not be configured to perform one or more example techniques described in this disclosure with respect to downsampling left neighboring luma samples. Video encoder 20 and video decoder 30 may not be configured to perform one or more example techniques described in this disclosure with respect to downsampling above neighboring luma samples, and may be configured to perform one or more example techniques described in this disclosure with respect to downsampling left neighboring luma samples. Video encoder 20 and video decoder 30 may be configured to perform one or more example techniques described in this disclosure with respect to downsampling above neighboring luma samples, and may be configured to perform one or more example techniques described in this disclosure with respect to downsampling left neighboring luma samples.

For left neighboring luma samples, as one example, during the derivation process of corresponding downsampled luma samples of chroma samples, a luma sample with coordinate $(x,y)$, where $x<x0-k$ and $y>=y0$, is not involved in the downsampling process of left neighboring luma samples of the current block. Here, k is an integer larger than 0. In one example, k is equal to 4.

Figure 13:
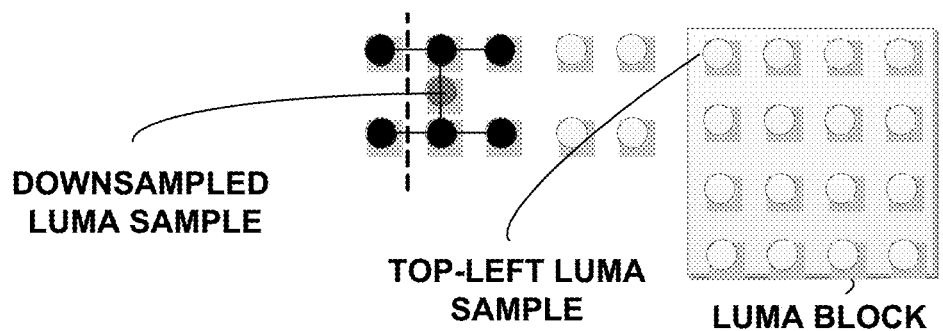
FIG. 13 is a conceptual diagram illustrating an example of luma samples that are fetched to get a downsampled luma sample.
Figure 14:
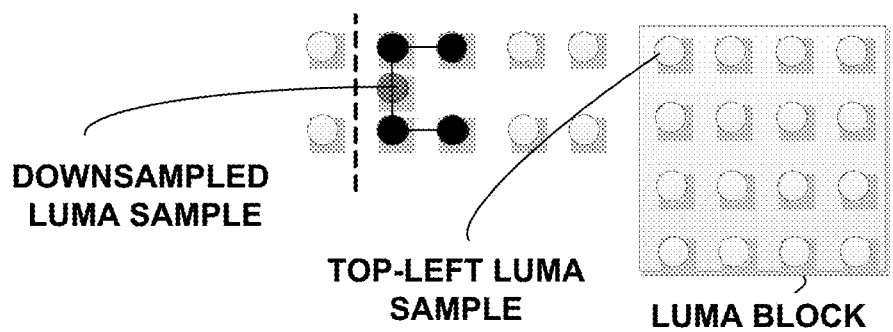
FIG. 14 is a conceptual diagram illustrating an example of luma samples that are fetched to get a downsampled luma sample.

FIG. 13 is a conceptual diagram illustrating an example of luma samples that are fetched to get a downsampled luma sample. FIG. 14 is a conceptual diagram illustrating another example of luma samples that are fetched to get a downsampled luma sample. FIG. 13 and FIG. 14 demonstrate the difference between the JCTVC-F502 downsampling methods (FIG. 13) and the techniques described in this disclosure (FIG. 14) respectively, when k=4. To get the second column downsampled left neighboring luma sample as described in the '145 Application and '029 Application, the downsampling method in JCTVC-F502 will fetch two luma samples with coordinate $(x0-5, y0)$ and $(x0-5, y0+1)$; while video encoder 20 and video decoder 30 may not fetch these two luma samples in accordance with examples of this disclosure.

In one example, the length of the filter (i.e., number of samples that the filter used as input) for deriving the corresponding downsampled luma sample of a chroma sample is shorter when the filtering process involves luma samples with coordinate $(x,y)$, where $x<x0-k$ and $y>=y0$.

Figure 15A:
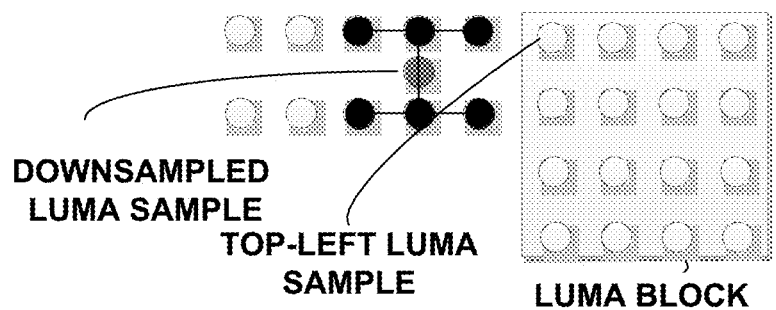
FIGS. 15A and 15B are conceptual diagrams illustrating different filter lengths for downsampled samples at different positions.
Figure 15B:
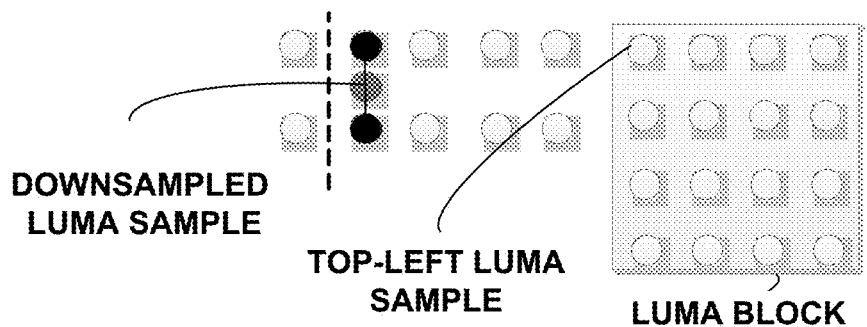

FIGS. 15A and 15B are conceptual diagrams illustrating different filter lengths for down-sampled samples at different positions. The downsampling filter proposed in JCTVC-F502 is used when no luma sample with coordinate $(x,y)$, where $x<x0-k$ and $y>=y0$, is involved in the filtering process as shown in FIG. 15A. On the other hand, the downsampling filter proposed in JCTVC-E266 is used when luma samples with coordinate $(x,y)$, where $x<x0-k$ and $y>=y0$ are involved in the JCTVC-F502 filtering process as shown in FIG. 15B.

In one example, the filters for deriving the corresponding downsampled luma sample of a chroma sample are the same regardless whether the filtering process involves luma samples with coordinate $(x,y)$, where $x<x0-k$ or not. However when the filtering process involves luma samples with coordinate $(x,y)$, where $x<x0-k$ and $y>=y0$, these luma samples are padded by adjacent luma samples instead of being fetched from the corresponding locations.

Figure 16A:
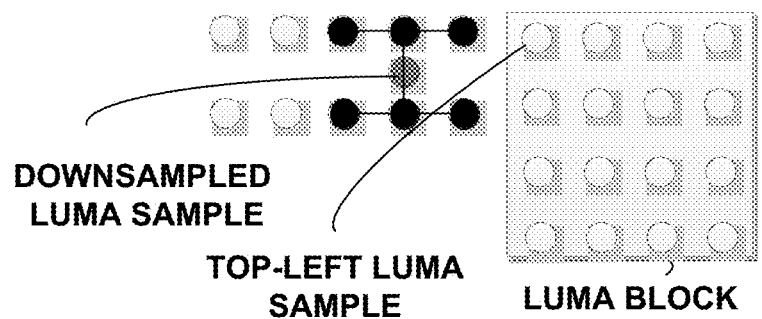
FIGS. 16A and 16B are conceptual diagrams illustrating filtering with padded samples.
Figure 16B:
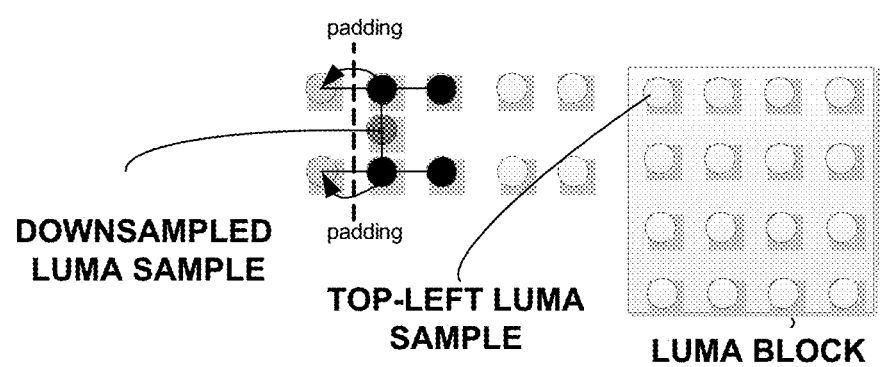

FIGS. 16A and 16B are conceptual diagrams illustrating filtering with padded samples. In FIGS. 16A and 16B, the downsampling filter proposed in JCTVC-F502 is always used, regardless whether a luma sample with coordinate $(x,y)$, where $x<x0-k$ and $y>=y0$, is involved in the filtering process or not. But when luma samples with coordinate $(x,y)$, where $x<x0-k$ and $y>=y0$, are involved, these samples are padded instead of being fetched as shown in FIG. 16B. Eq. (11) shows the padding process in a formula way.

$$rec_L(i,j)=(Rec_{LOrig}[2i,2j]*2+Rec'_{LOrig}[2i-1,2j]+Rec_{LOrig}[2i+1,2j]+Rec_{LOrig}[2i,2j+1]*2+Rec'_{LOrig}[2i-1,2j+1]+Rec_{LOrig}[2i+1,2j+1])>>3$$

where $$Rec'_{LOrig}[2i-1,2j]=Rec_{LOrig}[2i,2j]$$

$$Rec'_{LOrig}[2i-1,2j+1]=Rec_{LOrig}[2i,2j+1] \quad (11)$$

Accordingly, FIGS. 14-16B illustrate examples of which neighboring luma samples video encoder 20 and video decoder 30 fetch for downsampling luma samples. For instance, the fetched neighboring luma samples include a plurality of luma samples that are left of the luma block and exclude luma samples that are more than a threshold number (e.g., k) of samples left of the luma block and below a top-left luma sample of the luma block. Video encoder 20 and video decoder 30 may determine a plurality of downsampled luma samples based on the fetched neighboring luma samples. One of the downsampled luma samples corresponds to a downsampled luma sample that is the threshold number of samples left of the luma block.

For example, FIGS. 14, 15B, and 15B illustrate a downsampled luma sample that is four samples to the left of the luma block, and in this example the threshold number of samples left of the luma block is four (e.g., k=4). Hence, FIGS. 14, 15B, and 16B illustrate examples where the fetched neighboring luma samples include samples that are left of the luma block and exclude luma samples that are more than a threshold number of samples left of the luma block and are below a top-left luma sample, and where one of the downsampled luma samples corresponds to a downsampled luma sample that is the threshold number of samples left of the luma block.

FIGS. 15A and 16A illustrate a downsampled luma sample that is left of the luma block but not a threshold number of luma samples to the left of the luma block. For example, if the threshold number of luma samples to the left, beyond which luma samples are excluded from fetching, is four, then in FIGS. 15A and 16A, the downsampled luma samples are illustrated as two luma samples to the left of the luma block (e.g., in a column that is two luma samples to the left of the luma block). Accordingly, FIGS. 14-16B illustrate example ways in which video encoder 20 and video decoder 30 may determine a plurality of downsampled luma samples, where the downsampled luma sample in FIGS. 14, 15B, and 16B is one of the plurality of downsampled luma samples, and the downsampled luma sample in FIGS. 15A and 16A is another one of the plurality of downsampled luma samples.

As illustrated in FIGS. 14, 15B, and 15B, one of the downsampled luma samples corresponds to a downsampled luma sample that is the threshold number of luma samples to the left of the luma block (e.g., corresponds to a downsampled luma sample more than two columns since the threshold number is four). The fetched neighboring luma samples that are downsampled to generate the downsampled luma sample of FIGS. 14, 15B, and 16B exclude luma samples that are more than a threshold number (e.g., k=4) of samples left of the luma block and below a top-left luma sample of the luma block. In contrast, the fetched neighboring luma samples that are downsampled to generate the downsampled luma sample of FIG. 13 include luma samples that are more than a threshold number of samples left of the luma block. In some examples, the luma samples that are that are more than a threshold number of samples left of the luma block and are below a top-left luma sample of the luma block may not be stored in the line-buffer memory. Therefore, accessing these luma samples may be processing and bandwidth-inefficient. Hence, the example techniques may promote processing and bandwidth efficiency by excluding, from the fetching, luma samples that are more than a threshold number of samples left of the luma block and are below a top-left luma sample of the luma block.

However, in some examples, all of the luma samples needed for downsampling in accordance with the filter described in JCTVC-F502 may be stored in the line-buffer and in such examples, video encoder 20 and video decoder 30 may fetch all of the neighboring luma samples needed to perform the downsampling in accordance to the JCTVC-F502 filter. If all of the luma samples needed for downsampling in accordance with the filter of JCTVC-F502 are not available (e.g., because these luma samples are located more than a threshold number of samples left of the luma block and below a top-left luma sample of the luma block), then video encoder 20 and video decoder 30 may fetch different samples than those used in the filter of JCTVC-F502. It should be understood that reference to the filter of JCTVC-F502 is used merely as one example, and the techniques are applicable to other filters as well.

As illustrated in FIG. 15A, video encoder 20 and video decoder 30 may apply a first filter to a first set of the fetched neighboring luma samples, to determine a first downsampled luma sample of the plurality of downsampled luma samples, when no luma samples that are more than the threshold number of samples to the left of the luma block and below the top-left luma sample are needed for downsampling in accordance with the first filter. The first downsampled luma sample may be in a column that is a first number of columns to the left of the luma block. For instance, in FIGS. 15A and 16A, the first filter utilizes three luma samples from a first row that is left of the luma block, and utilizes three luma samples from a second row that is below the first row. Also in FIGS. 15A and 16A, the downsampled luma sample is in a column that is two columns to the left of the luma block. In FIGS. 15A and 16A, the first set of the fetched neighboring luma samples are the example luma samples utilized to generate the illustrated downsampled luma sample.

As illustrated in FIGS. 14 and 15B, video encoder 20 and video decoder 30 may apply a second filter to a second set of the fetched neighboring luma samples, to determine a second downsampled luma sample of the plurality of downsampled luma samples, when at least one luma sample that is more than the threshold number of samples to the left of the luma block and below the top-left luma sample of the luma block would have been needed for downsampling in accordance with the first filter. It should be understood that when video encoder 20 or video decoder 30 apply the second filter, video encoder 20 and video decoder 30 do not necessarily (although it is possible) determine that use of the first filter would result in fetching at least one luma sample that is more than the threshold number of samples to the left of the luma block and below the top-left luma sample. Rather, in the condition where use of the first filter would result in fetching at least one luma sample that is more than the threshold number of samples to the left of the luma block and below the top-left luma sample, video encoder 20 and video decoder 30 may utilize a second filter for downsampling that does not require fetching luma samples that are more than the threshold number of samples to the left of the luma block and below the top-left luma sample.

For instance, in FIGS. 14 and 15B, if the first filter (e.g., that used in FIG. 15A) were used, then video encoder 20 and video decoder 30 would have needed to fetch luma samples that are more than the threshold number of luma samples to the left of the luma block and below the top-left luma sample. To avoid fetching of luma samples that are more than the threshold number of luma samples to the left of the luma block and below the top-left luma samples, video encoder 20 and video decoder 30 may apply the second filter. In some examples, the second filter utilizes less than three luma samples from a first row that is left of the luma block (e.g., two luma samples in FIG. 14, and one luma sample in FIG. 15B), and utilizes less than three luma samples from a second row that is above the first row (e.g., two luma samples in FIG. 14, and one luma sample in FIG. 15B).

In FIGS. 14, 15A, and 15B, video encoder 20 and video decoder 30 may utilize different filters based on whether the fetching of the luma sample would result in fetching luma samples that are more than the threshold number of luma samples to the left of the luma block and below the top-left luma sample. However, the example techniques are not so limited.

In some examples, video encoder 20 and video decoder 30 may utilize one filter. In the condition where use of that filter for downsampling would result in video encoder 20 and video decoder 30 fetching luma samples that are more than the threshold number of luma samples to the left of the luma block and below the top-left luma sample, rather than fetching those luma samples, video encoder 20 and video decoder 30 may generate luma values (e.g., padding values described above). For instance, as illustrated in FIG. 16B, video encoder 20 and video decoder 30 may generate, without fetching, luma values (e.g., padding values) that correspond to luma samples located more than the threshold number of luma samples to the left of the luma block and below the top-left luma sample of the luma block. Video encoder 20 and video decoder 30 may apply a filter (e.g., filter from JCTVC-F502) to the generated luma values to determine at least one downsampled luma sample of the plurality of downsampled luma samples.

The aforementioned techniques may not be restricted to the specific downsampling filters described above, and may be used jointly with any downsampling filter. Also, the aforementioned techniques may not be restricted to yuv420 chroma format video/image coding. As one example, they can also be used in yuv422 chroma format video/image coding.

A grouping flag, named LM_flag, to indicate whether LM mode (such as the LM mode proposed in JCTVC-E266 or one of the multiple LM modes proposed in the '145 Application and '029 Application) is used, is coded by video encoder 20 or video decoder 30, as applicable. The context for coding this flag may depend on the coded/decoded LM flags of one or more neighboring blocks.

Figure 17:
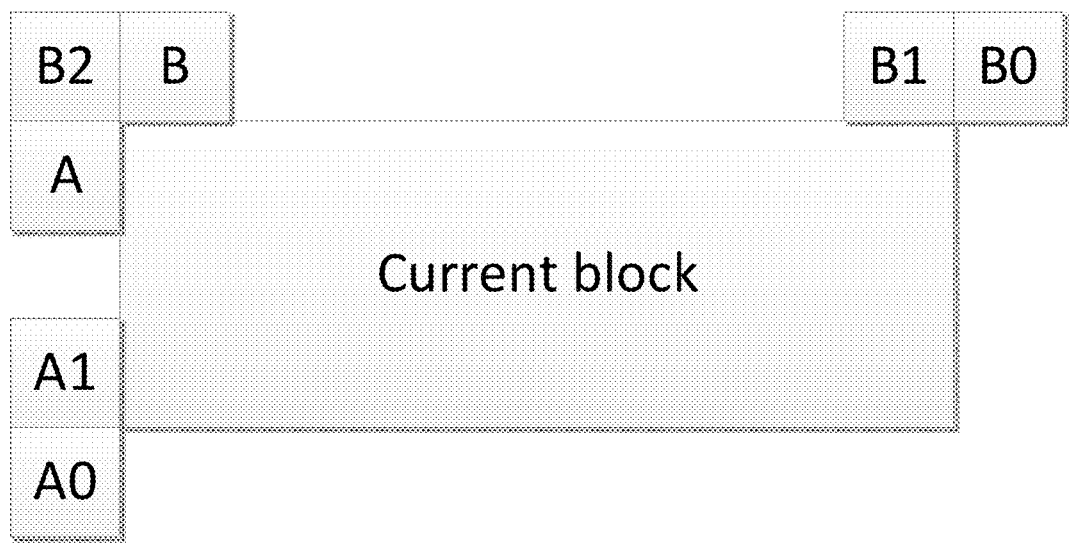
FIG. 17 is a conceptual diagram illustrating neighboring blocks of the current block.

In one example, such a flag is firstly coded. If this flag indicates a LM mode is used, the index of LM modes may be further signaled in the bitstream encoded by video encoder 20. Otherwise, the other chroma modes excluding LM modes may be further signaled. As an example, there can be 3 contexts for LM_flag: LM ctx[0], LM ctx[1], and LM ctx[2]. A variable ctx is calculated as ctx=LM_flag_A+ LM_flag_B, where LM_flag_A and LM_flag_B are the LM flags of neighboring blocks. In one example, the neighboring blocks denoted by A and B are shown in FIG. 17, respectively (e.g., A, A0, A1, B, B0, B1, and B2). FIG. 17 is a conceptual diagram illustrating neighboring blocks of the current block.

In one example, furthermore, when Block X (X being one of the neighboring blocks) is not coded by intra prediction or it does not exist (i.e., is not available), LM_flag_X is set equal to 0, where X is A or B. In one example, furthermore, when a neighboring block is located above the current block, it may be required that the neighboring block should be within the same LCU. If the neighboring block is outside the current LCU, it may be treated as unavailable.

Accordingly, in one example, video decoder 30 may decode a flag for a current block that includes the luma block and the chroma block. The flag (e.g., LM_flag) indicates that LM prediction coding is enabled for the chroma block. Video decoder 30 may be configured to decode the flag based on a context comprising one or more flags that indicate whether the LM prediction coding is enabled for neighboring blocks. Similarly, video encoder 20 may encode a flag for a current block that includes the luma block and the chroma block. The flag (e.g., LM_flag) indicates that LM prediction coding is enabled for the chroma block. Video encoder 20 may encode the flag based on a context comprising one or more flags that indicate whether the LM prediction coding is enabled for neighboring blocks.

In this disclosure, the example techniques described with respect to the LM_flag may be applied separately and independently from the example techniques related to which luma samples are downsampled for LM prediction. In some examples, video encoder 20 and video decoder 30 may be configured to exclude neighboring luma samples from the downsampling, as described above, and encode or decode the LM_flag as described above. In some examples, video encoder 20 and video decoder 30 may be configured to exclude neighboring luma samples from the downsampling, as described above, but not encode or decode the LM_flag as described above. In some examples, video encoder 20 and video decoder 30 may not be configured to exclude neighboring luma samples from the downsampling, as described above, but may be configured to encode or decode the LM_flag as described above.

The following describes an example for implementing one or more example techniques described in this disclosure. The example is for the example techniques for downfiltering (e.g., downsampling) the above neighboring luma samples, or for the example techniques for downfiltering (e.g., downsampling) the left neighboring luma samples. Supposing $Rec_{LOrig}[0, 0]$ represents the top-left luma sample of the current block, the downsampling process for the above neighboring luma samples is defined as follows:

if the chroma sample is not located at the leftmost of the above neighboring row, i.e., when i>0:

$$rec_L(i,-1)=((Rec_{LOrig}[2i,-2]*2+Rec_{LOrig}[2i-1,-2]+ \\ Rec_{LOrig}[2i+1,-2]+Rec_{LOrig}[2i,-1]*2+Rec_{LOrig} \\ [2i-1,-1]+Rec_{LOrig}[2i+1,-1]+\text{offset0})>>3 \quad (12)$$

Otherwise, i.e., when i is equal to 0:

$$rec_L(i,-1)=((Rec_{LOrig}[2i,-2]*3+Rec_{LOrig}[2i+1,-2]+ \\ Rec_{LOrig}[2i,-1]*3+Rec_{LOrig}[2i+1,-1]+ \\ \text{offset1})>>3 \quad (13)$$

In one example, offset0 and offset1 are both set equal to 0. In one example, offset0 and offset1 are both set equal to 4. For example, for downsampling the above luma samples according to the example of FIG. 10, video encoder 20 and video decoder 30 may apply equation (13) with offset of 0. For downsampling the left luma samples according to the example of FIG. 14, video encoder 20 and video decoder 30 may apply equation (13) with offset of 4. In this example, the offset is 4 because luma samples more than 4 samples to left of luma block are excluded from downsampling. The offset may be different than 4 if luma samples less than or more than 4 samples to the left of the luma block are excluded from downsampling.

For example, video encoder 20 and video decoder 30 may perform the operations of equation (12) (e.g., apply a first filter to a first set of the fetched neighboring luma samples) to determine a first downsampled luma sample when no luma samples that are above and left of the top-left luma sample are needed for downsampling in accordance with the operations of equation (12). As an example, video encoder 20 and video decoder 30 may perform the operations of equation (12) to determine the downsampled luma sample illustrated in FIG. 11A using the neighboring luma samples (e.g., a first set of the fetched neighboring luma samples) illustrated in FIG. 11A.

Video encoder 20 and video decoder 30 may perform the operations of equation (13) (e.g., apply a second filter to a second set of the fetched neighboring luma samples) to determine a second downsampled luma sample when at least one luma sample that is above and left of the top-left luma sample of the luma block is needed for downsampling in accordance with the operations of equation (12) (e.g., in accordance with the first filter). For example, if the first filter is used, then at least one luma sample that is above and left of the top-left luma sample of the luma block would have been needed for downsampling. As an example, video encoder 20 and video decoder 30 may perform the operations of equation (13) to determine the downsampled luma sample illustrated in FIG. 10 using the neighboring luma samples (e.g., a second set of the fetched neighboring luma samples) illustrated in FIG. 10.

For example, video encoder 20 and video decoder 30 may perform the operations of equation (12) (e.g., apply a first filter to a first set of the fetched neighboring luma samples) to determine a first downsampled luma sample when no luma samples that are more than the threshold number of samples (e.g., k samples) to the left of the luma block and below the top-left luma sample are needed for downsampling in accordance with the operations of equation (12). The first downsampled luma sample is in a column that is a first number of columns to the left of the luma block. As an example, video encoder 20 and video decoder 30 may perform the operations of equation (12) to determine the downsampled luma sample illustrated in FIG. 16A using the neighboring luma samples (e.g., a first set of the fetched neighboring luma samples) illustrated in FIG. 15A. As illustrated, the downsampled luma sample in FIG. 15A is two columns to the left of the luma block.

Video encoder 20 and video decoder 30 may perform the operations of equation (13) (e.g., apply a second filter to a second set of the fetched neighboring luma samples) to determine a second downsampled luma sample when at least one luma sample that is more than the threshold number of samples (e.g., k samples) to the left of the luma block and below the top-left luma sample of the luma block is needed for downsampling in accordance with the operations of equation (12) (e.g., in accordance with the first filter). For example, if the first filter is used, then at least one luma sample that is more than the threshold number of samples (e.g., k samples) to the left of the luma block and below the top-left luma sample of the luma block would have been needed for downsampling. The second downsampled luma sample is in a column that is a second number of columns to the left of the luma block, and the second number is greater than the first number. As an example, video encoder 20 and video decoder 30 may perform the operations of equation (13) to determine the downsampled luma sample illustrated in FIG. 14 using the neighboring luma samples (e.g., a second set of the fetched neighboring luma samples) illustrated in FIG. 14.

Figure 2:
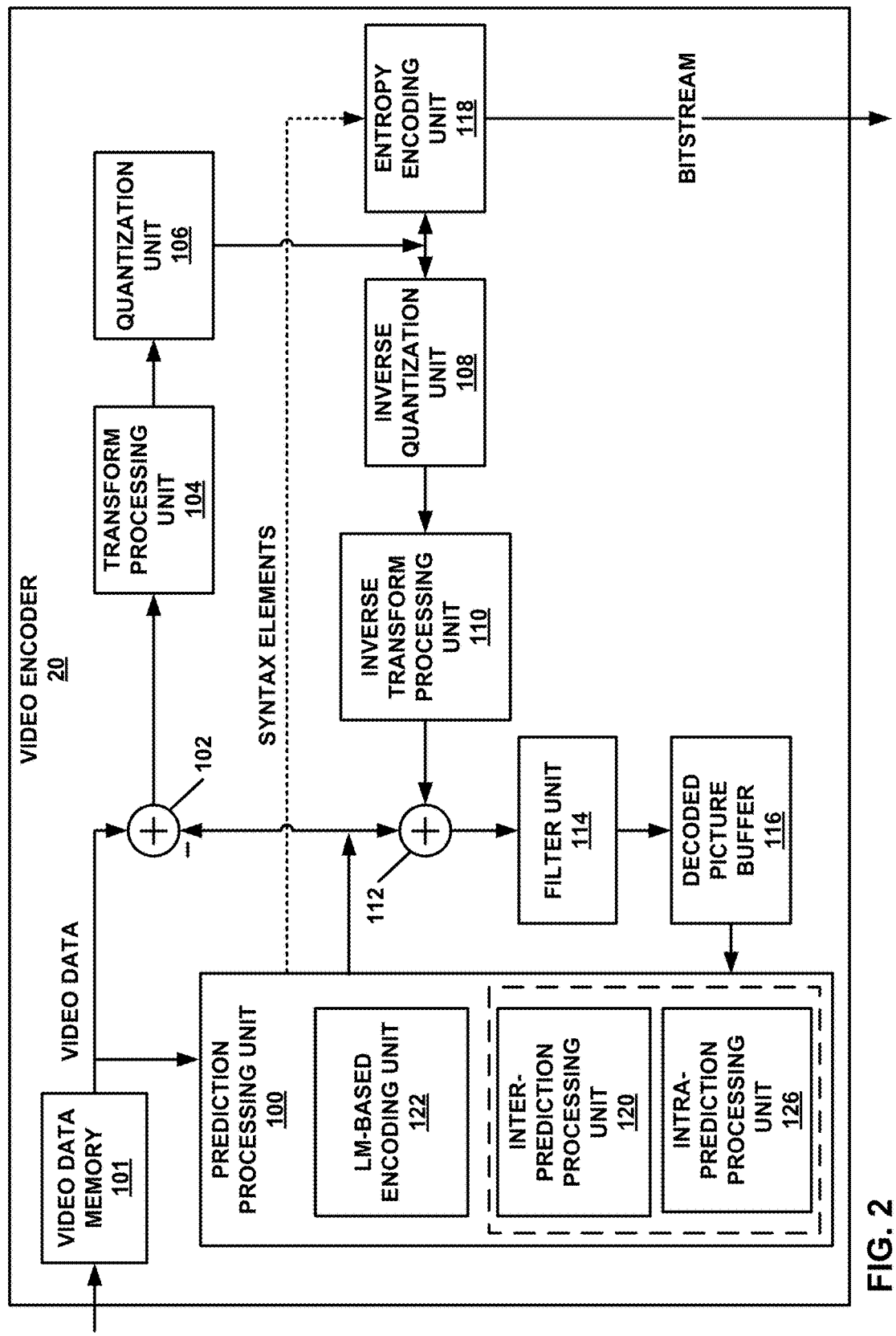
FIG. 2 is a block diagram illustrating an example video encoder that may implement the techniques described in this disclosure.

FIG. 2 is a block diagram illustrating an example video encoder 20 that may implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods, including those under development presently or in the future.

Video encoder 20 represents an example of a device that may be configured to perform techniques for LM-based video coding in accordance with various examples described in this disclosure. For example, video encoder 20 may be configured to code one or more blocks using LM video coding.

In the example of FIG. 2, video encoder 20 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer (DPB) 116, and an entropy encoding unit 118. Prediction processing unit 100 includes an inter-prediction processing unit 120 and an intra-prediction processing unit 126. Inter-prediction processing unit 120 includes a motion estimation unit and a motion compensation unit (not shown). Video encoder 20 also includes a linear model (LM)-based encoding unit 122 configured to perform various aspects of the LM-based coding techniques described in this disclosure. In other examples, video encoder 20 may include more, fewer, or different functional components.

Video data memory 101 may store video data to be encoded by the components of video encoder 20. The video data stored in video data memory 101 may be obtained, for example, from video source 18. DPB 116 may be a reference picture memory that stores reference video data for use in encoding video data by video encoder 20 (e.g., in intra- or inter-coding modes). Video data memory 101 and DPB 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and DPB 116 may be provided by the same memory device or separate memory devices. In various examples, video data memory 101 may be on-chip with other components of video encoder 20, or off-chip relative to those components.

In this disclosure, reference to video data memory 101 should not be interpreted as being limited to memory internal to video encoder 20, unless specifically described as such, or memory external to video encoder 20, unless specifically described as such. Reference to video data memory 101 should be understood as reference to memory that stores video data that video encoder 20 receives for encoding (e.g., video data for a current block that is to be encoded). Video data memory 101 may also provide temporary storage of outputs from the various units of video encoder 20.

As one example, video data memory 101 is an example of a line-buffer that is internal to video encoder 20 and stores samples of neighboring blocks that neighbor the current block being encoded. As another example, part of DPB 116 may be the line-buffer that is internal to video encoder 20, and part of DPB 116 may be memory that is external to video encoder 20, as part of the system memory of the IC chip that includes video encoder 20. As another example, the line-buffer may be cache memory of video encoder 20.

The various units of FIG. 2 are illustrated to assist with understanding the operations performed by video encoder 20. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 20 may include arithmetic logic units (ALUs), elementary function units (EFUs), digital circuits, analog circuits, and/or programmable cores, formed from programmable circuits. In examples where the operations of video encoder 20 are performed by software executed by the programmable circuits, video data memory 101 may store the object code of the software that video encoder 20 receives and executes, or another memory (not shown) may store such instructions.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller block may be coding blocks of CUs. For example, prediction processing unit 100 may partition a CTB associated with a CTU into four equally-sized sub-blocks, partition one or more of the sub-blocks into four equally-sized sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame.

If a PU is in a P slice, the motion estimation unit of inter-prediction processing unit 120 may search the reference pictures in a list of reference pictures (e.g., "RefPicList0") for a reference region for the PU. The reference region for the PU may be a region, within a reference picture, that contains sample blocks that most closely corresponds to the sample blocks of the PU. The motion estimation unit may generate a reference index that indicates a position in RefPicList0 of the reference picture containing the reference region for the PU. In addition, the motion estimation unit may generate an MV that indicates a spatial displacement between a coding block of the PU and a reference location associated with the reference region. For instance, the MV may be a two-dimensional vector that provides an offset from the coordinates in the current decoded picture to coordinates in a reference picture. The motion estimation unit may output the reference index and the MV as the motion information of the PU. The motion compensation unit of inter-prediction processing unit 120 may generate the predictive blocks of the PU based on actual or interpolated samples at the reference location indicated by the motion vector of the PU.

If a PU is in a B slice, the motion estimation unit of inter-prediction processing unit 120 may perform uni-prediction or bi-prediction for the PU. To perform uni-prediction for the PU, the motion estimation unit may search the reference pictures of RefPicList0 or a second reference picture list ("RefPicList1") for a reference region for the PU. The motion estimation unit may output, as the motion information of the PU, a reference index that indicates a position in RefPicList0 or RefPicList1 of the reference picture that contains the reference region, an MV that indicates a spatial displacement between a prediction block of the PU and a reference location associated with the reference region, and one or more prediction direction indicators that indicate whether the reference picture is in RefPicList0 or RefPicList1. The motion compensation unit of inter-prediction processing unit 120 may generate the predictive blocks of the PU based at least in part on actual or interpolated samples at the reference region indicated by the motion vector of the PU.

To perform bi-directional inter prediction for a PU, the motion estimation unit may search the reference pictures in RefPicList0 for a reference region for the PU and may also search the reference pictures in RefPicList1 for another reference region for the PU. The motion estimation unit may generate reference picture indexes that indicate positions in RefPicList0 and RefPicList1 of the reference pictures that contain the reference regions. In addition, the motion estimation unit may generate MVs that indicate spatial displacements between the reference location associated with the reference regions and a sample block of the PU. The motion information of the PU may include the reference indexes and the MVs of the PU. The motion compensation unit of inter-prediction processing unit 120 may generate the predictive blocks of the PU based at least in part on actual or interpolated samples at the reference regions indicated by the motion vectors of the PU.

LM-based encoding unit 122 may perform the linear model (LM) prediction encoding. For example, LM-based encoding unit 122 may downsample reconstructed luma samples of a luma block that corresponds to a current chroma block that is being encoded. LM-based encoding unit 122 may scale the downsampled reconstructed luma samples of the luma block to generate a predictive block. Residual generation unit 102 may determine a residual block indicating a difference in sample values between the chroma block and the predictive block. In some examples, LM-based encoding unit 122 may apply such techniques as part of cross-component residual prediction. In this case, the chroma block is a chroma residual block and the luma block is a luma residual block.

For example, LM-based encoding unit 122 may determine a luma block that corresponds to a chroma block. LM-based encoding unit 122 may fetch neighboring luma samples for downsampling the neighboring luma samples utilizing the example techniques described in this disclosure, and determine a plurality of downsampled luma samples based on the fetched neighboring luma samples. LM-based encoding unit 122 may determine one or more scaling parameters based on the downsampled luma samples (e.g., α and β, described above). LM-based encoding unit 122 may determine a predictive block based on the one or more scaling parameters. For example, LM-based encoding unit 122 may determine α*rec$_L$(i,j)+β, where rec$_L$(i,j) is a downsampled version of the luma block that corresponds to the chroma block, and α and β are scaling factors determined from downsampled neighboring luma samples. LM-based encoding unit 122 may perform the downsampling of the neighboring luma samples in accordance with one or more example techniques described in this disclosure such as techniques to limit access of neighboring luma samples stored outside the line-buffer.

Video encoder 20 may then LM prediction encode the chroma block based on the predictive block. For example, as described below, video encoder 20 may subtract the predictive block from the chroma block to generate a residual block used, by video decoder 30, to reconstruct the chroma block.

In the techniques described in this disclosure, LM-based encoding unit 122 may implement one or more of the above example techniques as part of the downsampling of the luma samples of a luma block. As one example, LM-based encoding unit 122 may determine a luma block that corresponds to a chroma block that is being coded, wherein a coordinate of a left-top of the luma block is (x0, y0), determine luma samples, stored in DPB 116 or video data memory 101, for downsampling, the determined luma samples excluding luma samples having an x-coordinate less than x0 and a y-coordinate less than y0, downsample the luma block based on the determined luma samples, determine a predictive block based on the downsampled luma block, and linear model (LM) prediction encode the chroma block based on the predictive block. For example, determining the luma samples for downsampling includes excluding luma samples having an x-coordinate less than x0 and a y-coordinate less than y0.

For instance, LM-based encoding unit 122 may fetch neighboring luma samples for downsampling the neighboring luma samples. The fetched neighboring luma samples include a plurality of luma samples that are above the luma block and exclude luma samples that are above and left of a top-left luma sample of the luma block. For instance, luma samples illustrated in FIG. 9 (e.g., left of the dashed line) that are above and left of a top-left luma sample of the luma block are excluded from the luma samples that are fetched.

As another example, LM-based encoding unit 122 may determine a luma block that corresponds to a chroma block that is being coded, wherein a coordinate of a left-top of the luma block is (x0, y0), determine luma samples, stored in DPB 116 or video data memory 101, for downsampling, the determined luma samples excluding luma samples having an x-coordinate less than (x0−k) and a y-coordinate greater than or equal to y0, wherein k is an integer larger than 0, downsample the luma block based on the determined luma samples, determine a predictive block based on the downsampled luma block, and linear model (LM) prediction encode the chroma block based on the predictive block. For example, determining the luma samples for downsampling includes excluding luma samples having an x-coordinate less than (x0−k) and a y-coordinate greater than or equal to y0.

For instance, LM-based encoding unit 122 may fetch neighboring luma samples for downsampling the neighboring luma samples. The fetched neighboring luma samples include a plurality of luma samples that are left of the luma block and exclude luma samples that are more than a threshold number of samples left of the luma block and below a top-left luma sample of the luma block. For instance, luma samples illustrated in FIG. 13 (e.g., left of the dashed line) that are more than a threshold number of samples left of the luma block (e.g., more than 4 samples to the left) and below the top-left sample of the luma block are excluded from the luma samples that are fetched.

In one case, LM-based encoding unit 122 may apply a first filter (e.g., that of JCTVC-F502) when no luma samples having an x-coordinate less than x0 and a y-coordinate less than y0 are needed for downsampling in accordance with the first filter, and apply a second different, filter (e.g., that of JCTVC-E266 or equation 13) when luma samples having an x-coordinate less than x0 and a y-coordinate less than y0 are needed for downsampling in accordance with the first filter. In these examples, in another case, LM-based encoding unit 122 may determine whether applying a filter would result in using luma samples having an x-coordinate less than x0 and a y-coordinate less than y0, generate luma values for luma samples having the x-coordinate less than x0 and the y-coordinate less than y0 without fetching luma values for the luma samples. For example, LM-based encoding unit may pad values based on adjacent luma samples as illustrated in FIG. 12B, and apply a filter using the generated luma values to downsample the luma block, wherein the filter is a same filter used for downsampling if applying the filter would not result in using luma samples having an x-coordinate less than x0 and a y-coordinate less than y0.

For instance, for the above neighboring luma samples, LM-based encoding unit 122 may apply a first filter to a first set of the fetched neighboring luma samples, to determine a first downsampled luma sample of the plurality of downsampled luma samples, when no luma samples that are above and left of the top-left luma sample are needed for downsampling in accordance with the first filter. LM-based encoding unit 122 may apply a second, different filter to a second set of the fetched neighboring luma samples, to determine a second downsampled luma sample of the plurality of downsampled luma samples, when at least one luma sample that is above and left of the top-left luma sample of the luma block is needed for downsampling in accordance with the first filter.

For the left neighboring luma samples, LM-based encoding unit 122 may apply a first filter to a first set of the fetched neighboring luma samples, to determine a first downsampled luma sample of the plurality of downsampled luma samples, when no luma samples that are more than the threshold number of samples to the left of the luma block and below the top-left luma sample are needed for downsampling in accordance with the first filter. The first downsampled luma sample is in a column that is a first number of columns to the left of the luma block. LM-based encoding unit 122 may apply a second, different filter to a second set of the fetched neighboring luma samples, to determine a second downsampled luma sample of the plurality of downsampled luma samples, when at least one luma sample that is more than the threshold number of samples to the left of the luma block and below the top-left luma sample of the luma block is needed for downsampling in accordance with the first filter. The second downsampled luma sample is in a column that is a second number of columns to the left of the luma block, and the second number is greater than the first number.

In one example, for the above neighboring luma samples, LM-based encoding unit 122 may generate, without fetching from video data memory 101, luma values that correspond to luma samples located above and left of the top-left luma sample of the luma block, and apply a filter to the generated luma values to determine at least one downsampled luma sample of the plurality of downsampled luma samples. In one example, for the left neighboring luma samples, LM-based encoding unit 122 may generate, without fetching from video data memory 101, luma values that correspond to luma samples located more than the threshold number of samples left of the luma block and below the top-left luma sample of the luma block, and apply a filter to the generated luma values to determine at least one downsampled luma sample of the plurality of downsampled luma samples.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs, the predictive data generated by intra-prediction processing unit 126 for the PUs, or the predictive data generated by LM-based encoding unit 122. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding blocks of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information; thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. DPB 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU. Moreover, LM-based encoding unit 122 may utilize reconstructed luma blocks in DPB 116 for linear model (LM) prediction encoding a chroma block (where the luma block may include video data in some examples or may be a residual luma block and the chroma block may include video data in some examples or may be a residual chroma block).

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 118. For instance, the bitstream may include data that represents a RQT for a CU.

Figure 3:
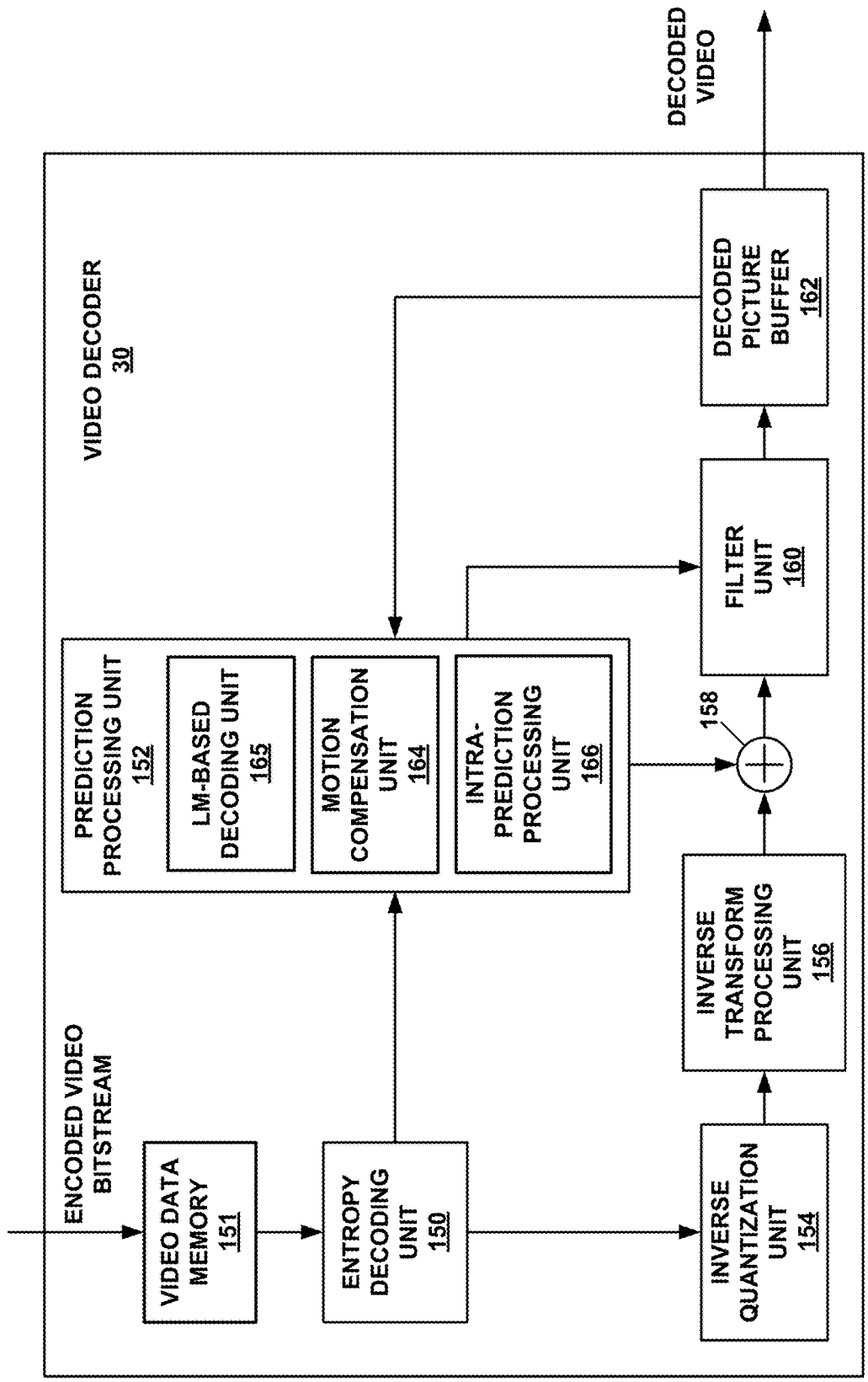
FIG. 3 is a block diagram illustrating an example video decoder that may implement the techniques described in this disclosure.

FIG. 3 is a block diagram illustrating an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

Video encoder 30 represents an example of a device that may be configured to perform techniques for LM-based video coding in accordance with various examples described in this disclosure. For example, video encoder 30 may be configured to code one or more blocks utilizing a LM video coding mode (i.e., linear model (LM) prediction decode one or more blocks).

In the example of FIG. 3, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer (DPB) 162. Prediction processing unit 152 includes a motion compensation unit 164 and an intra-prediction processing unit 166. Video decoder 30 also includes a linear model (LM)-based decoding unit 165 configured to perform various aspects of the LM-based coding techniques described in this disclosure. In other examples, video decoder 30 may include more, fewer, or different functional components.

Video data memory 151 may store video data, such as an encoded video bitstream, to be decoded by the components of video decoder 30. The video data stored in video data memory 151 may be obtained, for example, from computer-readable medium 16 (e.g., from a local video source, such as a camera, via wired or wireless network communication of video data, or by accessing physical data storage media). Video data memory 151 may form a coded picture buffer (CPB) that stores encoded video data from an encoded video bitstream. DPB 162 may be a reference picture memory that stores reference video data for use in decoding video data by video decoder 30 (e.g., in intra- or inter-coding modes). Video data memory 151 and DPB 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and DPB 162 may be provided by the same memory device or separate memory devices. In various examples, video data memory 151 may be on-chip with other components of video decoder 30, or off-chip relative to those components.

In this disclosure, reference to video data memory 151 should not be interpreted as being limited to memory internal to video decoder 30, unless specifically described as such, or memory external to video decoder 30, unless specifically described as such. Reference to video data memory 151 should be understood as reference memory that stores video data that video decoder 30 receives for decoding (e.g., video data for a current block that is to be encoded). Video data memory 151 may also provide temporary storage of outputs from the various units of video decoder 30.

As one example, video data memory 151 is an example of a line-buffer that is internal to video decoder 30 and stores samples of neighboring blocks that neighbor the current block being decoded. As another example, part of DPB 162 may be the line-buffer that is internal to video decoder 30, and part of DPB 162 may be memory that is external to video decoder 30, as part of the system memory of the IC chip that includes video decoder 30. As another example, the line-buffer may be cache memory of video decoder 30.

The various units of FIG. 3 are illustrated to assist with understanding the operations performed by video decoder 30. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 20 may include arithmetic logic units (ALUs), elementary function units (EFUs), digital circuits, analog circuits, and/or programmable cores, formed from programmable circuits. In examples where the operations of video decoder 30 are performed by software executed by the programmable circuits, video data memory 151 may store the object code of the software that video decoder 30 receives and executes, or another memory (not shown) may store such instructions.

A coded picture buffer (CPB) may receive and store encoded video data (e.g., NAL units) of a bitstream. Entropy decoding unit 150 may receive encoded video data (e.g., NAL units) from the CPB and parse the NAL units to decode syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition to decoding syntax elements from the bitstream, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements decoded from the bitstream.

Prediction processing unit 152 may construct a first reference picture list (RefPicList0) and a second reference picture list (RefPicList1) based on syntax elements extracted from the bitstream. Furthermore, if a PU is encoded using inter prediction, entropy decoding unit 150 may extract motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb, and Cr blocks in DPB 162, intra prediction or inter prediction operations on PUs of other CUs.

In accordance with various examples of this disclosure, video decoder 30 may be configured to perform LM-based coding. LM-based decoding unit 165, for example, may perform the linear model (LM) prediction decoding. For example, LM-based decoding unit 165 may downsample reconstructed luma samples of a luma block that corresponds to a current chroma block that is being decoded. LM-based decoding unit 165 may scale the downsampled reconstructed luma samples of the luma block to generate a predictive block. Reconstruction unit 158 may then add the generated predictive block to the decoded residual data for the chroma block to reconstruct the chroma block. In some examples, LM-based decoding unit 165 may apply such techniques as part of cross-component residual prediction. In this case, the chroma block is a chroma residual block and the luma block is a luma residual block.

For example, LM-based decoding unit 165 may determine a luma block that corresponds to a chroma block. LM-based decoding unit 165 may fetch neighboring luma samples for downsampling the neighboring luma samples utilizing the example techniques described in this disclosure, and determine a plurality of downsampled luma samples based on the fetched neighboring luma samples. LM-based decoding unit 165 may determine one or more scaling parameters based on the downsampled luma samples (e.g., $\alpha$ and $\beta$, described above). LM-based decoding unit 165 may determine a predictive block based on the one or more scaling parameters. For example, LM-based decoding unit 165 may determine $\alpha*\text{rec}_L(i,j)+\beta$, where $\text{rec}_L(i,j)$ is a downsampled version of the luma block that corresponds to the chroma block, and $\alpha$ and $\beta$ are scaling factors determined from downsampled neighboring luma samples. LM-based decoding unit 165 may perform the downsampling of the neighboring luma samples in accordance with one or more example techniques described in this disclosure such as techniques to limit access of neighboring luma samples stored outside the line-buffer.

Video decoder 30 may then LM prediction decode the chroma block based on the predictive block. For example, as described below, video decoder 30 may add the predictive block to a residual block to reconstruct the chroma block.

In the techniques described in this disclosure, LM-based decoding unit 165 may implement one or more of the above example techniques as part of the downsampling of the luma samples of a luma block. As one example, LM-based decoding unit 165 may determine a luma block that corresponds to a chroma block that is being coded, wherein a coordinate of a left-top of the luma block is (x0, y0), determine luma samples, stored in DPB 162 or video data memory 151, for downsampling, the determined luma samples excluding luma samples having an x-coordinate less than x0 and a y-coordinate less than y0, downsample the luma block based on the determined luma samples, determine a predictive block based on the downsampled luma block, and linear model (LM) prediction decode the chroma block based on the predictive block. For example, determining the luma samples for downsampling includes excluding luma samples having an x-coordinate less than x0 and a y-coordinate less than y0.

For instance, LM-based decoding unit 165 may fetch neighboring luma samples for downsampling the neighboring luma samples. The fetched neighboring luma samples include a plurality of luma samples that are above the luma block and exclude luma samples that are above and left of a top-left luma sample of the luma block. For instance, luma samples illustrated in FIG. 9 (e.g., left of the dashed line) that are above and left of a top-left luma sample of the luma block are excluded from the luma samples that are fetched.

As another example, LM-based decoding unit 165 may determine a luma block that corresponds to a chroma block that is being coded, wherein a coordinate of a left-top of the luma block is (x0, y0), determine luma samples, stored in DPB 162 or video data memory 151, for downsampling, the determined luma samples excluding luma samples having an x-coordinate less than (x0−k) and a y-coordinate greater than or equal to y0, wherein k is an integer larger than 0, downsample the luma block based on the determined luma samples, determine a predictive block based on the downsampled luma block, and linear model (LM) prediction decode the chroma block based on the predictive block. For example, determining the luma samples for downsampling includes excluding luma samples having an x-coordinate less than (x0−k) and a y-coordinate greater than or equal to y0.

For instance, LM-based decoding unit 165 may fetch neighboring luma samples for downsampling the neighboring luma samples. The fetched neighboring luma samples include a plurality of luma samples that are left of the luma block and exclude luma samples that are more than a threshold number of samples left of the luma block and below a top-left luma sample of the luma block. For instance, luma samples illustrated in FIG. 13 (e.g., left of the dashed line) that are more than a threshold number of samples left of the luma block (e.g., more than 4 samples to the left) and below the top-left sample of the luma block are excluded from the luma samples that are fetched.

In one case, LM-based decoding unit 165 may apply a first filter (e.g., that of JCTVC-F502) when no luma samples having an x-coordinate less than x0 and a y-coordinate less than y0 are needed for downsampling in accordance with the first filter, and apply a second different, filter (e.g., that of JCTVC-E266 or equation 13) when luma samples having an x-coordinate less than x0 and a y-coordinate less than y0 is needed for downsampling in accordance with the first filter. In these examples, in another case, LM-based decoding unit 165 may determine whether applying a filter would result in using luma samples having an x-coordinate less than x0 and a y-coordinate less than y0, generate luma values for luma samples having the x-coordinate less than x0 and the y-coordinate less than y0 without fetching luma values for the luma samples (e.g., pad values based on adjacent luma samples as illustrated in FIG. 16B), and apply a filter using the generated luma values to downsample the luma block, wherein the filter is a same filter used for downsampling neighboring luma samples if applying the filter would not result in using luma samples having an x-coordinate less than x0 and a y-coordinate less than y0.

For instance, for the above neighboring luma samples, LM-based decoding unit 165 may apply a first filter to a first set of the fetched neighboring luma samples, to determine a first downsampled luma sample of the plurality of downsampled luma samples, when no luma samples that are above and left of the top-left luma sample are needed for downsampling in accordance with the first filter. LM-based decoding unit 165 may apply a second, different filter to a second set of the fetched neighboring luma samples, to determine a second downsampled luma sample of the plurality of downsampled luma samples, when at least one luma sample that is above and left of the top-left luma sample of the luma block is needed for downsampling in accordance with the first filter.

For the left neighboring luma samples, LM-based decoding unit 165 may apply a first filter to a first set of the fetched neighboring luma samples, to determine a first downsampled luma sample of the plurality of downsampled luma samples, when no luma samples that are more than the threshold number of samples to the left of the luma block and below the top-left luma sample are needed for downsampling in accordance with the first filter. The first downsampled luma sample is in a column that is a first number of columns to the left of the luma block. LM-based decoding unit 165 may apply a second, different filter to a second set of the fetched neighboring luma samples, to determine a second downsampled luma sample of the plurality of downsampled luma samples, when at least one luma sample that is more than the threshold number of samples to the left of the luma block and below the top-left luma sample of the luma block is needed for downsampling in accordance with the first filter. The second downsampled luma sample is in a column that is a second number of columns to the left of the luma block, and the second number is greater than the first number.

In one example, for the above neighboring luma samples, LM-based decoding unit 165 may generate, without fetching from video data memory 151, luma values that correspond to luma samples located above and left of the top-left luma sample of the luma block, and apply a filter to the generated luma values to determine at least one downsampled luma sample of the plurality of downsampled luma samples. In one example, for the left neighboring luma samples, LM-based decoding unit 165 may generate, without fetching from video data memory 151, luma values that correspond to luma samples located more than the threshold number of samples left of the luma block and below the top-left luma sample of the luma block, and apply a filter to the generated luma values to determine at least one downsampled luma sample of the plurality of downsampled luma samples.

Figure 18:
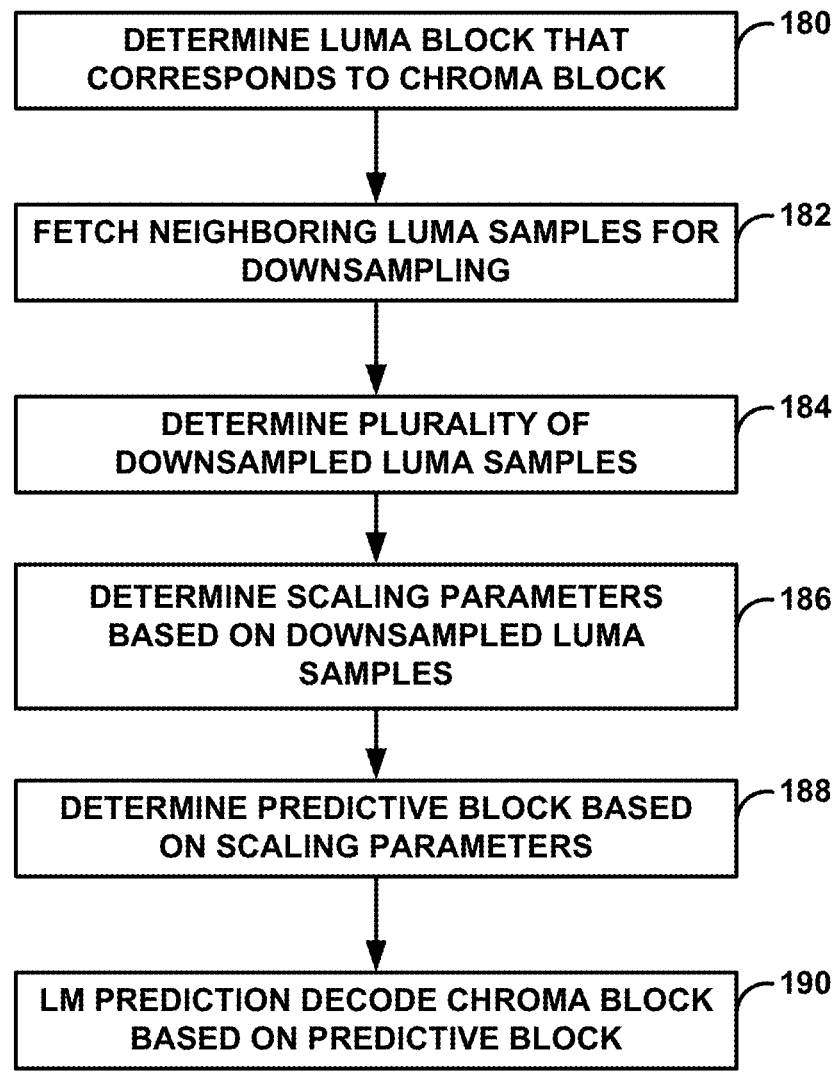
FIG. 18 is a flowchart illustrating an example method of decoding video data.

FIG. 18 is a flowchart illustrating an example method of decoding video data. As illustrated, LM-based decoding unit 165 may determine a luma block that corresponds to a chroma block (180). As described above, a block may include a luma block and two chroma blocks. A luma block that corresponds to a chroma block means that the luma block and the corresponding chroma block are from the same block.

LM-based decoding unit 165 may fetch neighboring luma samples for downsampling the neighboring luma samples (182). In one or more examples, LM-based decoding unit 165 may exclude certain neighboring luma samples from fetching. The luma samples that are not fetched may be described relative to the top-left sample of a luma block having coordinate (x0, y0).

For instance, for the example where the neighboring luma samples are above the luma block, LM-based decoding unit 165 may exclude luma samples that are above and left of a top-left luma sample of the luma block. As one example, the luma samples left of the dashed line in FIG. 9 may not be fetched because they are above and left of a top-left luma sample of the luma block. In this example, the fetched neighboring luma samples exclude luma samples having an x-coordinate less than x0 and a y-coordinate less than y0. Rather, the luma samples such as those illustrated in FIGS. 10, 11A, and 11B may be fetched.

For the example where the neighboring luma samples are left of the luma block, LM-based decoding unit 165 may exclude luma samples that are more than a threshold number of samples left of the luma block and below a top-left luma sample of the luma block. As one example, the luma samples left of the dashed lines in FIG. 13 may not be fetched because they are more than a threshold number of samples (e.g., more than 4 samples) left of the luma block and below a top-left luma sample of the luma block. In this example, the fetched neighboring luma samples exclude luma samples having an x-coordinate less than (x0−k), and a y-coordinate greater than y0, wherein k is the threshold number and an integer larger than 0 (e.g., 4). Rather, the luma samples such as those illustrated in FIGS. 14, 15A, and 15B may be fetched.

LM-based decoding unit 165 may determine a plurality of downsampled luma samples based on the fetched neighboring luma samples (184). For the example where the neighboring samples are above the luma block, one of the downsampled luma samples corresponds to a downsampled luma sample immediately above the top-left luma sample. For instance, as illustrated in FIGS. 10, 11B, and 12B, the downsampled luma sample is immediately above the top-left luma sample. For the example where the neighboring samples are left of the luma block, one of the downsampled luma samples corresponds to a downsampled luma sample that is the threshold number of samples left of the luma block. FIGS. 11A and 12A illustrate an additional example of a downsampled luma sample. For instance, as illustrated in FIGS. 14, 15B, and 16B, the downsampled luma sample is 4 samples to the left of the luma block, and in this example, the threshold number of samples left of the luma block is 4. In these examples, the downsampled luma sample is more than two columns to the left of the top-left luma sample (e.g., the downsampled luma sample is 4 columns to the left, which is greater than 2 columns to the left). FIGS. 15A and 16A illustrate an additional example of a downsampled luma sample.

For the example where the neighboring luma samples are above the luma block, LM-based decoding unit 165 may apply a first filter to a first set of the fetched neighboring luma samples to determine a first downsampled luma sample of the plurality of downsampled luma samples, when no luma samples that are above and left of the top-left luma sample are needed for downsampling in accordance with the first filter. For example, LM-based decoding unit 165 may apply a filter such as those of JCTVC-F502 (as one example), and as illustrated in FIGS. 11A and 12A. LM-based decoding unit 165 may apply a second, different filter to a second set of the fetched neighboring luma samples to determine a second downsampled luma sample of the plurality of downsampled luma samples, when at least one luma sample that is above and left of the top-left luma sample of the luma block is needed (e.g., would have been needed if first were used) for downsampling in accordance with the first filter. For example, if utilizing the filter described in JCTVC-F502 would result in accessing luma samples that are above and left of the top-left luma sample, then LM-based decoding unit 165 may apply a filter like the filter described in JCTVC-E266 (e.g., FIG. 11B) or in accordance with equation (13) described above (e.g., FIG. 10).

For the example where the neighboring luma samples are left of the luma block, LM-based decoding unit 165 may apply a first filter to a first set of the fetched neighboring luma samples, to determine a first downsampled luma sample of the plurality of downsampled luma samples, when no luma samples that are more than the threshold number of samples to the left of the luma block and below the top-left luma sample are needed for downsampling in accordance with the first filter. For example, LM-based decoding unit 165 may apply a filter such as those of JCTVC-F502 (as one example), and as illustrated in FIGS. 15A and 16A. LM-based decoding unit 165 may apply a second, different filter to a second set of the fetched neighboring luma samples, to determine a second downsampled luma sample of the plurality of downsampled luma samples, when at least one luma sample that is more than the threshold number of samples to the left of the luma block and below the top-left luma sample of the luma block is needed (e.g., would have been needed if first were used) for downsampling in accordance with the first filter. For example, if utilizing the filter described in JCTVC-F502 would result in accessing luma samples that are more than the threshold number of samples to the left of the luma block and below the top-left luma sample, then LM-based decoding unit 165 may apply a filter like the filter described in JCTVC-E266 (e.g., as shown in FIG. 15B) or in accordance with equation (13) described above (e.g., as show in FIG. 14).

In the above examples, the first filter utilizes three luma samples from a first row that is above the luma block, and utilizes three luma samples from a second row that is above the first row. The second filter utilizes less than three luma samples from a first row (e.g., two samples in FIGS. 9 and 14, and one sample in FIGS. 11B and 15B) that is left of the luma block, and utilizes less than three luma samples from a second row (e.g., two samples in FIGS. 9 and 14, and one sample in FIGS. 11B and 15B) that is below the first row.

In some examples, rather than using different filters, LM-based decoding unit 165 may use the same filter, but apply padding (e.g., generate luma sample values) rather than fetch. For instance, for the examples of above neighboring luma samples, LM-based decoding unit 165 may generate, without fetching, luma values that correspond to luma samples located above and left of the top-left luma sample of the luma block, and may apply a filter to the generated luma values to determine at least one downsampled luma sample of the plurality of downsampled luma samples (e.g., the example of FIG. 12B). For the examples of left neighboring luma samples, LM-based decoding unit 165 may generate, without fetching, luma values that correspond to luma samples located more than the threshold number of samples left of the luma block and below the top-left luma sample of the luma block, and may apply a filter to the generated luma values to determine at least one downsampled luma sample of the plurality of downsampled luma samples (e.g., the example of 16B).

LM-based decoding unit 165 may determine one or more scaling parameters based on the downsampled luma samples (186). For example, LM-based decoding unit 165 may determine $\alpha$ and $\beta$ based on the downsampled luma samples. LM-based decoding unit 165 may determine a predictive block based on the one or more scaling parameters (188). For example, LM-based decoding unit 165 may determine the predictive block as $\alpha^* \text{rec}_L(i,j)+\beta$, where $\text{rec}_L(i,j)$ is a downsampled version of the luma block that corresponds to the chroma block, and $\alpha$ and $\beta$ are scaling factors determined from downsampled neighboring luma samples.

Video decoder 30 may LM prediction decode the chroma block based on the predictive block (190). For example, reconstruction unit 158 may add the predictive block to a residual block to reconstruct the chroma block.

Figure 19:
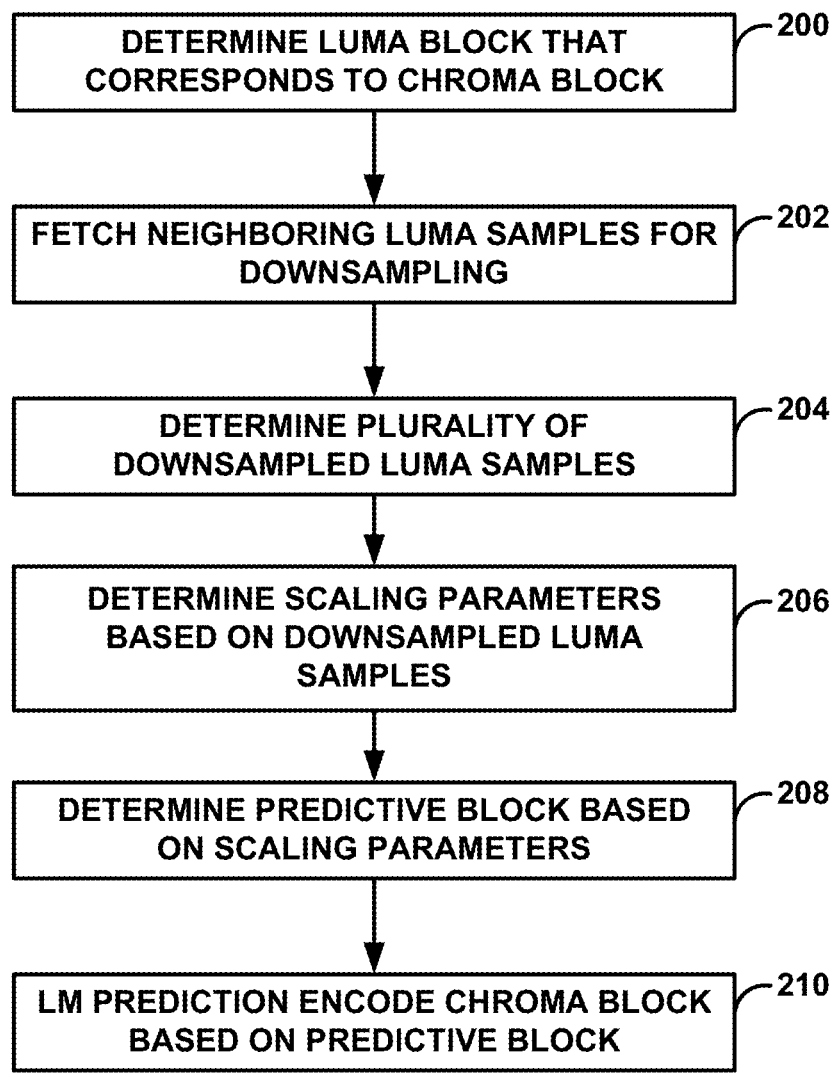
FIG. 19 is a flowchart illustrating an example method of encoding video data.

FIG. 19 is a flowchart illustrating an example method of encoding video data. As illustrated, LM-based encoding unit 122 may determine a luma block that corresponds to a chroma block (200). As described above, a block may include a luma block and two chroma blocks. A luma block that corresponds to a chroma block means that the luma block and the corresponding chroma block are from the same block.

LM-based encoding unit 122 may fetch neighboring luma samples for downsampling the neighboring luma samples (202). In one or more examples, LM-based encoding unit 122 may exclude certain neighboring luma samples from fetching. The luma samples that are not fetched may be described relative to the top-left sample of a luma block having coordinate (x0, y0).

For instance, for the example where the neighboring luma samples are above the luma block, LM-based encoding unit 122 may exclude luma samples that are above and left of a top-left luma sample of the luma block. As one example, the luma samples left of the dashed line in FIG. 9 may not be fetched because they are above and left of a top-left luma sample of the luma block. In this example, the fetched neighboring luma samples exclude luma samples having an x-coordinate less than x0, and a y-coordinate less than y0. Rather, the luma samples such as those illustrated in FIGS. 10, 11A, and 11B may be fetched.

For the example where the neighboring luma samples are left of the luma block, LM-based encoding unit 122 may exclude luma samples that are more than a threshold number of samples left of the luma block and below a top-left luma sample of the luma block. As one example, the luma samples left of the dashed lines in FIG. 13 may not be fetched because they are more than a threshold number of samples (e.g., more than 4 samples) left of the luma block and below a top-left luma sample of the luma block. In this example, the fetched neighboring luma samples exclude luma samples having an x-coordinate less than (x0−k), and a y-coordinate greater than y0, wherein k is the threshold number and an integer larger than 0 (e.g., 4). Rather, the luma samples such as those illustrated in FIGS. 14, 15A, and 15B may be fetched.

LM-based encoding unit 122 may determine a plurality of downsampled luma samples based on the fetched neighboring luma samples (204). For the example where the neighboring samples are above the luma block, one of the downsampled luma samples corresponds to a downsampled luma sample immediately above the top-left luma sample. For instance, as illustrated in FIGS. 10, 11B, and 12B, the downsampled luma sample is immediately above the top-left luma sample. For the example where the neighboring samples are left of the luma block, one of the downsampled luma samples corresponds to a downsampled luma sample that is the threshold number of samples left of the luma block. FIGS. 11A and 12A illustrate an additional example of a downsampled luma sample. For instance, as illustrated in FIGS. 14, 15B, and 16B, the downsampled luma sample is 4 samples to the left of the luma block, and in this example, the threshold number of samples left of the luma block is 4. In these examples, the downsampled luma sample is more than two columns to the left of the top-left luma sample (e.g., the downsampled luma sample is 4 columns to the left, which is greater than 2 columns to the left). FIGS. 15A and 16A illustrate an additional example of a downsampled luma sample.

For the example where the neighboring luma samples are above the luma block, LM-based encoding unit 122 may apply a first filter to a first set of the fetched neighboring luma samples, to determine a first downsampled luma sample of the plurality of downsampled luma samples, when no luma samples that are above and left of the top-left luma sample are needed for downsampling in accordance with the first filter. For example, LM-based encoding unit 122 may apply a filter such as those of JCTVC-F502 (as one example), and as illustrated in FIGS. 11A and 12A. LM-based encoding unit 122 may apply a second, different filter to a second set of the fetched neighboring luma samples, to determine a second downsampled luma sample of the plurality of downsampled luma samples, when at least one luma sample that is above and left of the top-left luma sample of the luma block would have been needed for downsampling in accordance with the first filter. For example, if utilizing the filter described in JCTVC-F502 would result in accessing luma samples that are above and left of the top-left luma sample, then LM-based encoding unit 122 may apply a filter like JCTVC-E266 (e.g., FIG. 11B) or in accordance with equation (13) described above (e.g., FIG. 10).

For the example where the neighboring luma samples are left of the luma block, LM-based encoding unit 122 may apply a first filter to a first set of the fetched neighboring luma samples, to determine a first downsampled luma sample of the plurality of downsampled luma samples, when no luma samples that more than the threshold number of samples to the left of the luma block and below the top-left luma sample are needed for downsampling in accordance with the first filter. For example, LM-based encoding unit 122 may apply a filter such as those of JCTVC-F502 (as one example), and as illustrated in FIGS. 15A and 16A. LM-based encoding unit 122 may apply a second, different filter to a second set of the fetched neighboring luma samples, to determine a second downsampled luma sample of the plurality of downsampled luma samples, when at least one luma sample that is more than the threshold number of samples to the left of the luma block and below the top-left luma sample of the luma block would have been needed for downsampling in accordance with the first filter. For example, if utilizing the filter described in JCTVC-F502 would result in accessing luma samples that are more than the threshold number of samples to the left of the luma block and below the top-left luma sample, then LM-based decoding unit 165 may apply a filter like JCTVC-E266 (e.g., FIG. 15B) or in accordance with equation (13) described above (e.g., FIG. 14).

In the above examples, the first filter utilizes three luma samples from a first row that is above the luma block, and utilizes three luma samples from a second row that is above the first row. The second filter utilizes less than three luma samples from a first row (e.g., two samples in FIGS. 9 and 14, and one sample in FIGS. 11B and 15B) that are left of the luma block, and utilizes less than three luma samples from a second row (e.g., two samples in FIGS. 9 and 14, and one sample in FIGS. 11B and 15B) that is below the first row.

In some examples, rather than using different filters, LM-based encoding unit 122 may use the same filter, but apply padding (e.g., generate luma sample values) rather than fetch. For instance, for the examples of above neighboring luma samples, LM-based encoding unit 122 may generate, without fetching, luma values that correspond to luma samples located above and left of the top-left luma sample of the luma block, and may apply a filter to the generated luma values to determine at least one downsampled luma sample of the plurality of downsampled luma samples (e.g., the example of FIG. 12B). For the examples of left neighboring luma samples, LM-based encoding unit 122 may generate, without fetching, luma values that correspond to luma samples located more than the threshold number of samples left of the luma block and below the top-left luma sample of the luma block, and may apply a filter to the generated luma values to determine at least one downsampled luma sample of the plurality of downsampled luma samples (e.g., the example of 16B).

LM-based encoding unit 122 may determine one or more scaling parameters based on the downsampled luma samples (206). For example, LM-based encoding unit 122 may determine α and β based on the downsampled luma samples. LM-based encoding unit 122 may determine a predictive block based on the one or more scaling parameters (208). For example, LM-based encoding unit 122 may determine the predictive block as $\alpha^* rec_L(i,j)+\beta$, where $rec_L(i,j)$ is a downsampled version of the luma block that corresponds to the chroma block, and $\alpha$ and $\beta$ are scaling factors determined from downsampled neighboring luma samples.

Video encoder may LM prediction encode the chroma block based on the predictive block (210). For example, residual generation unit 102 may subtract the predictive block from the chroma block to generate a residual block, used by video decoder 30, to reconstruct the chroma block.

The techniques described above may be performed by video encoder 20 (FIGS. 1 and 2) and/or video decoder 30 (FIGS. 1 and 3), both of which may be generally referred to as a video coder. Likewise, video coding may refer to video encoding or video decoding, as applicable. In addition, video encoding and video decoding may be generically referred to as "processing" video data.

It should be understood that all of the techniques described herein may be used individually or in combination. This disclosure includes several signaling methods which may change depending on certain factors such as block size, slice type etc. Such variation in signaling or inferring the syntax elements may be known to the encoder and decoder a-priori or may be signaled to the decoder explicitly in the video parameter set (VPS), sequence parameter set (SPS), picture parameter set (PPS), slice header, at a tile level or elsewhere.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially. In addition, while certain aspects of this disclosure are described as being performed by a single module or unit for purposes of clarity, it should be understood that the techniques of this disclosure may be performed by a combination of units or modules associated with a video coder.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a luma block that corresponds to a chroma block;
   fetching neighboring luma samples for downsampling the neighboring luma samples, wherein the fetched neighboring luma samples comprise a plurality of luma samples from a plurality of rows that are above the luma block and exclude luma samples that are above and left of a top-left luma sample of the luma block;

determining a plurality of downsampled luma samples based on the fetched neighboring luma samples, wherein one of the downsampled luma samples corresponds to a downsampled luma sample immediately above the top-left luma sample, and wherein the downsampled luma sample is determined from luma samples from the plurality of rows that are above the luma block;

determining one or more scaling parameters based on the downsampled luma samples;

determining a predictive block based on the one or more scaling parameters; and linear model (LM) prediction decoding the chroma block based on the predictive block.

2. The method of claim 1, wherein a coordinate of the top-left luma sample of the luma block is (x0, y0), and wherein the fetched neighboring luma samples exclude luma samples having an x-coordinate less than x0 and a y-coordinate less than y0.

3. The method of claim 1, wherein determining the plurality of downsampled luma samples comprises:

applying a first filter to a first set of the fetched neighboring luma samples to determine a first downsampled luma sample of the plurality of downsampled luma samples, based on a determination that no luma samples that are above and left of the top-left luma sample are needed for downsampling in accordance with the first filter; and applying a second, different filter to a second set of the fetched neighboring luma samples to determine a second downsampled luma sample of the plurality of downsampled luma samples, based on a determination that at least one luma sample that is above and left of the top-left luma sample of the luma block is needed for downsampling in accordance with the first filter.

4. The method of claim 3, wherein the first filter utilizes three luma samples from a first row that is above the luma block and three luma samples from a second row that is above the first row.

5. The method of claim 3, wherein the second filter utilizes less than three luma samples from a first row that is above the luma block and less than three luma samples from a second row that is above the first row.

6. The method of claim 1, wherein determining the plurality of downsampled luma samples comprises:

generating, without fetching, luma values that correspond to luma samples located above and left of the top-left luma sample of the luma block; and applying a filter to the generated luma values to determine at least one downsampled luma sample of the plurality of downsampled luma samples.

7. The method of claim 1, wherein LM prediction decoding the chroma block based on the predictive block comprises adding the predictive block to a residual block to reconstruct the chroma block.

8. The method of claim 1, further comprising:

decoding a flag for a current block that includes the luma block and the chroma block, wherein the flag indicates that LM prediction coding is enabled for the chroma block, and wherein decoding the flag comprises decoding the flag based on a context comprising one or more flags that indicate whether the LM prediction coding is enabled for neighboring blocks.

9. A device for decoding video data, the device comprising:

a video data memory; and a video decoder comprising at least one of fixed-function circuitry or programmable circuitry, wherein the video decoder is configured to:

determine a luma block that corresponds to a chroma block;

fetch, from the video data memory, neighboring luma samples for downsampling the neighboring luma samples, wherein the fetched neighboring luma samples comprise a plurality of luma samples from a plurality of rows that are above the luma block and exclude luma samples that are above and left of a top-left luma sample of the luma block;

determine a plurality of downsampled luma samples based on the fetched neighboring luma samples, wherein one of the downsampled luma samples corresponds to a downsampled luma sample immediately above the top-left luma sample, and wherein the downsampled luma sample is determined from luma samples from the plurality of rows that are above the luma block;

determine one or more scaling parameters based on the downsampled luma samples;

determine a predictive block based on the one or more scaling parameters; and linear model (LM) prediction decode the chroma block based on the predictive block.

10. The device of claim 9, wherein a coordinate of the top-left luma sample of the luma block is (x0, y0), and wherein the fetched neighboring luma samples exclude luma samples having an x-coordinate less than x0 and a y-coordinate less than y0.

11. The device of claim 9, wherein to determine the plurality of downsampled luma samples, the video decoder is configured to:

apply a first filter to a first set of the fetched neighboring luma samples, to determine a first downsampled luma sample of the plurality of downsampled luma samples, based on a determination that no luma samples that are above and left of the top-left luma sample are needed for downsampling in accordance with the first filter; and apply a second, different filter to a second set of the fetched neighboring luma samples, to determine a second downsampled luma sample of the plurality of downsampled luma samples, based on a determination that at least one luma sample that is above and left of the top-left luma sample of the luma block is needed for downsampling in accordance with the first filter.

12. The device of claim 11, wherein the first filter utilizes three luma samples from a first row that is above the luma block and three luma samples from a second row that is above the first row.

13. The device of claim 11, wherein the second filter utilizes less than three luma samples from a first row that is above the luma block and less than three luma samples from a second row that is above the first row.

14. The device of claim 9, wherein to determine the plurality of downsampled luma samples, the video decoder is configured to:

generate, without fetching, luma values that correspond to luma samples located above and left of the top-left luma sample of the luma block; and apply a filter to the generated luma values to determine at least one downsampled luma sample of the plurality of downsampled luma samples.

15. The device of claim 9, wherein to LM prediction decode the chroma block based on the predictive block, the video decoder is configured to add the predictive block to a residual block to reconstruct the chroma block.

16. The device of claim 9, wherein the video decoder is configured to:
decode a flag for a current block that includes the luma block and the chroma block, wherein the flag indicates that LM prediction coding is enabled for the chroma block, and wherein decoding the flag comprises decoding the flag based on a context comprising one or more flags that indicate whether the LM prediction coding is enabled for neighboring blocks.

17. A method of encoding video data, the method comprising:
determining a luma block that corresponds to a chroma block;
fetching neighboring luma samples for downsampling the neighboring luma samples, wherein the fetched neighboring luma samples comprise a plurality of luma samples from a plurality of rows that are above the luma block and exclude luma samples that are above and left of a top-left luma sample of the luma block;
determining a plurality of downsampled luma samples based on the fetched neighboring luma samples, wherein one of the downsampled luma samples corresponds to a downsampled luma sample immediately above the top-left luma sample, and wherein the downsampled luma sample is determined from luma samples from the plurality of rows that are above the luma block;
determining one or more scaling parameters based on the downsampled luma samples;
determining a predictive block based on the one or more scaling parameters; and
linear model (LM) prediction encoding the chroma block based on the predictive block.

18. The method of claim 17, wherein a coordinate of the top-left luma sample of the luma block is (x0, y0), and wherein the fetched neighboring luma samples exclude luma samples having an x-coordinate less than x0 and a y-coordinate less than y0.

19. The method of claim 17, wherein determining the plurality of downsampled luma samples comprises:
applying a first filter to a first set of the fetched neighboring luma samples, to determine a first downsampled luma sample of the plurality of downsampled luma samples, based on a determination that no luma samples that are above and left of the top-left luma sample are needed for downsampling in accordance with the first filter; and
applying a second, different filter to a second set of the fetched neighboring luma samples, to determine a second downsampled luma sample of the plurality of downsampled luma samples, based on a determination that at least one luma sample that is above and left of the top-left luma sample of the luma block would is needed for downsampling in accordance with the first filter.

20. The method of claim 19, wherein the first filter utilizes three luma samples from a first row that is above the luma block and three luma samples from a second row that is above the first row.

21. The method of claim 19, wherein the second filter utilizes less than three luma samples from a first row that is above the luma block and less than three luma samples from a second row that is above the first row.

22. The method of claim 17, wherein determining the plurality of downsampled luma samples comprises:
generating, without fetching, luma values that correspond to luma samples located above and left of the top-left luma sample of the luma block; and
applying a filter to the generated luma values to determine at least one downsampled luma sample of the plurality of downsampled luma samples.

23. The method of claim 17, wherein LM prediction encoding the chroma block based on the predictive block comprises subtracting the predictive block from the chroma block to generate a residual block to be used, by a video decoder, to reconstruct the chroma block.

24. The method of claim 17, further comprising:
encoding a flag for a current block that includes the luma block and the chroma block, wherein the flag indicates that LM prediction coding is enabled for the chroma block, and wherein encoding the flag comprises encoding the flag based on a context comprising one or more flags that indicate whether the LM prediction coding is enabled for neighboring blocks.

25. A device for encoding video data, the device comprising:
a video data memory; and
a video encoder comprising at least one of fixed-function circuitry or programmable circuitry, wherein the video encoder is configured to:
determine a luma block that corresponds to a chroma block;
fetch, from the video data memory, neighboring luma samples for downsampling the neighboring luma samples, wherein the fetched neighboring luma samples comprise a plurality of luma samples from a plurality of rows that are above the luma block and exclude luma samples that are above and left of a top-left luma sample of the luma block;
determine a plurality of downsampled luma samples based on the determined neighboring luma samples, wherein one of the downsampled luma samples corresponds to a downsampled luma sample immediately above the top-left luma sample, and wherein the downsampled luma sample is determined from luma samples from the plurality of rows that are above the luma block;
determine one or more scaling parameters based on the downsampled luma samples;
determine a predictive block based on the one or more scaling parameters; and
linear model (LM) prediction encode the chroma block based on the predictive block.

26. The device of claim 25, wherein a coordinate of the top-left luma sample of the luma block is (x0, y0), and wherein the fetched neighboring luma samples exclude luma samples having an x-coordinate less than x0 and a y-coordinate less than y0.

27. The device of claim 25, wherein to determine the plurality of downsampled luma samples, the video encoder is configured to:
apply a first filter to a first set of the fetched neighboring luma samples, to determine a first downsampled luma sample of the plurality of downsampled luma samples, based on a determination that no luma samples that are above and left of the top-left luma sample are needed for downsampling in accordance with the first filter; and apply a second, different filter to a second set of the fetched neighboring luma samples, to determine a second downsampled luma sample of the plurality of downsampled luma samples, based on a determination that at least one luma sample that is above and left of the top-left luma sample of the luma block is needed for downsampling in accordance with the first filter.

28. The device of claim 27, wherein the first filter utilizes three luma samples from a first row that is above the luma block and three luma samples from a second row that is above the first row.

29. The device of claim 27, wherein the second filter utilizes less than three luma samples from a first row that is above the luma block and less than three luma samples from a second row that is above the first row.

30. The device of claim 25, wherein to determine the plurality of downsampled luma samples, the video encoder is configured to:
generate, without fetching, luma values that correspond to luma samples located above and left of the top-left luma sample of the luma block; and
apply a filter to the generated luma values to determine at least one downsampled luma sample of the plurality of downsampled luma samples.

31. The device of claim 25, wherein to LM prediction encode the chroma block based on the predictive block, the video encoder is configured to subtract the predictive block from the chroma block to generate a residual block, to be used by a video decoder, to reconstruct the chroma block.

32. The device of claim 25, wherein the video encoder is configured to:
encode a flag for a current block that includes the luma block and the chroma block, wherein the flag indicates that LM prediction coding is enabled for the chroma block, and wherein encoding the flag comprises encoding the flag based on a context comprising one or more flags that indicate whether the LM prediction coding is enabled for neighboring blocks.

33. A method of decoding video data, the method comprising:
determining a luma block that corresponds to a chroma block;
fetching neighboring luma samples for downsampling the neighboring luma samples, wherein the fetched neighboring luma samples comprise a plurality of luma samples that are left of the luma block from a plurality of rows and exclude luma samples that are more than a threshold number of samples left of the luma block and below a top-left luma sample of the luma block;
determining a plurality of downsampled luma samples based on the fetched neighboring luma samples, wherein one of the downsampled luma samples corresponds to a downsampled luma sample that is the threshold number of samples left of the luma block, and wherein the downsampled luma sample is determined from luma samples from the plurality of rows that are left of the luma block;
determining one or more scaling parameters based on the downsampled luma samples;
determining a predictive block based on the one or more scaling parameters; and
linear model (LM) prediction decoding the chroma block based on the predictive block.

34. The method of claim 33, wherein a coordinate of the top-left luma sample of the luma block is (x0, y0), and wherein the fetched neighboring luma samples exclude luma samples having an x-coordinate less than (x0-k) and a y-coordinate greater than y0, and wherein k is the threshold number and k is an integer larger than 0.

35. The method of claim 34, wherein k equals 4.

36. The method of claim 33, wherein one of the downsampled luma samples corresponds to a downsampled luma sample more than two columns to the left of the top-left luma sample.

37. The method of claim 33, wherein determining the plurality of downsampled luma samples comprises:
applying a first filter to a first set of the fetched neighboring luma samples, to determine a first downsampled luma sample of the plurality of downsampled luma samples, based on a determination that no luma samples that are more than the threshold number of samples to the left of the luma block and below the top-left luma sample are needed for downsampling in accordance with the first filter, and wherein the first downsampled luma sample is in a column that is a first number of columns to the left of the luma block; and
applying a second, different filter to a second set of the fetched neighboring luma samples, to determine a second downsampled luma sample of the plurality of downsampled luma samples, based on a determination that at least one luma sample that is more than the threshold number of samples to the left of the luma block and below the top-left luma sample of the luma block is needed for downsampling in accordance with the first filter, wherein the second downsampled luma sample is in a column that is a second number of columns to the left of the luma block, and wherein the second number is greater than the first number.

38. The method of claim 37, wherein the first filter utilizes three luma samples from a first row that is left of the luma block and three luma samples from a second row that is below the first row.

39. The method of claim 37, wherein the second filter utilizes less than three luma samples from a first row that is left of the luma block and less than three luma samples from a second row that is below the first row.

40. The method of claim 33, wherein determining the plurality of downsampled luma samples comprises:
generating, without fetching, luma values that correspond to luma samples located more than the threshold number of samples left of the luma block and below the top-left luma sample of the luma block; and
applying a filter to the generated luma values to determine at least one downsampled luma sample of the plurality of downsampled luma samples.

41. The method of claim 33, wherein LM prediction decoding the chroma block based on the predictive block comprises adding the predictive block to a residual block to reconstruct the chroma block.

42. The method of claim 33, further comprising:
decoding a flag for a current block that includes the luma block and the chroma block, wherein the flag indicates that LM prediction coding is enabled for the chroma block, and wherein decoding the flag comprises decoding the flag based on a context comprising one or more flags that indicate whether the LM prediction coding is enabled for neighboring blocks.

43. A device for decoding video data, the device comprising:
 a video data memory; and
 a video decoder comprising at least one of fixed-function circuitry or programmable circuitry, wherein the video decoder is configured to:
  determine a luma block that corresponds to a chroma block;
  fetch neighboring luma samples for downsampling the neighboring luma samples, wherein the fetched neighboring luma samples comprise a plurality of luma samples from a plurality of rows that are left of the luma block and exclude luma samples that are more than a threshold number of samples left of the luma block and below a top-left luma sample of the luma block;
  determine a plurality of downsampled luma samples based on the fetched neighboring luma samples, wherein one of the downsampled luma samples corresponds to a downsampled luma sample that is the threshold number of samples left of the luma block, and wherein the downsampled luma sample is determined from luma samples from the plurality of rows that are left of the luma block;
  determine one or more scaling parameters based on the downsampled luma samples;
  determine a predictive block based on the one or more scaling parameters; and
  linear model (LM) prediction decode the chroma block based on the predictive block.

44. The device of claim 43, wherein a coordinate of the top-left luma sample of the luma block is (x0, y0), and wherein the fetched neighboring luma samples exclude luma samples having an x-coordinate less than (x0-k) and a y-coordinate greater than y0, and wherein k is the threshold number and k is an integer larger than 0.

45. The device of claim 44, wherein k equals 4.

46. The device of claim 43, wherein one of the downsampled luma samples corresponds to a downsampled luma sample more than two columns to the left of the top-left luma sample.

47. The device of claim 43, wherein to determine the plurality of downsampled luma samples, the video decoder is configured to:
 apply a first filter to a first set of the neighboring luma samples, to determine a first downsampled luma sample of the plurality of downsampled luma samples, based on a determination that no luma samples that are more than the threshold number of samples to the left of the luma block and below the top-left luma sample are needed for downsampling in accordance with the first filter, and wherein the first downsampled luma sample is in a column that is a first number of columns to the left of the luma block; and
 apply a second, different filter to a second set of the neighboring luma samples, to determine a second downsampled luma sample of the plurality of downsampled luma samples, based on a determination that at least one luma sample that is more than the threshold number of samples to the left of the luma block and below the top-left luma sample of the luma block is needed for downsampling in accordance with the first filter, wherein the second downsampled luma sample is in a column that is a second number of columns to the left of the luma block, and wherein the second number is greater than the first number.

48. The device of claim 47, wherein the first filter utilizes three luma samples from a first row that is left of the luma block and three luma samples from a second row that is below the first row.

49. The device of claim 47, wherein the second filter utilizes less than three luma samples from a first row that is left of the luma block and less than three luma samples from a second row that is below the first row.

50. The device of claim 43, wherein to determine the plurality of downsampled luma samples, the video decoder is configured to:
 generate, without fetching, luma values that correspond to luma samples located more than the threshold number of samples left of the luma block and below the top-left luma sample of the luma block; and
 apply a filter to the generated luma values to determine at least one downsampled luma sample of the plurality of downsampled luma samples.

51. The device of claim 43, wherein to LM prediction decode the chroma block, the video decoder is configured to add the predictive block to a residual block to reconstruct the chroma block.

52. The device of claim 43, wherein the video decoder is configured to:
 decode a flag for a current block that includes the luma block and the chroma block, wherein the flag indicates that LM prediction coding is enabled for the chroma block, and wherein to decode the flag, the video decoder is configured to decode the flag based on a context comprising one or more flags that indicate whether the LM prediction coding is enabled for neighboring blocks.

53. A method of encoding video data, the method comprising:
 determining a luma block that corresponds to a chroma block;
 fetching neighboring luma samples for downsampling the neighboring luma samples, wherein the fetched neighboring luma samples comprise a plurality of luma samples from a plurality of rows that are left of the luma block and exclude luma samples that are more than a threshold number of samples left of the luma block and below a top-left luma sample of the luma block;
 determining a plurality of downsampled luma samples based on the fetched neighboring luma samples, wherein one of the downsampled luma samples corresponds to a downsampled luma sample that is the threshold number of samples left of the luma block, and wherein the downsampled luma sample is determined from luma samples from the plurality of rows that are left of the luma block;
 determining one or more scaling parameters based on the downsampled luma samples;
 determining a predictive block based on the one or more scaling parameters; and
 linear model (LM) prediction encoding the chroma block based on the predictive block.

54. The method of claim 53, wherein a coordinate of the top-left luma sample of the luma block is (x0, y0), and wherein the fetched neighboring luma samples exclude luma samples having an x-coordinate less than (x0-k) and a y-coordinate greater than y0, and wherein k is the threshold number and k is an integer larger than 0.

55. The method of claim 54, wherein k equals 4.

56. The method of claim 53, wherein one of the downsampled luma samples corresponds to a downsampled luma sample more than two columns to the left of the top-left luma sample.

57. The method of claim 53, wherein determining the plurality of downsampled luma samples comprises:
applying a first filter to a first set of the fetched neighboring luma samples, to determine a first downsampled luma sample of the plurality of downsampled luma samples, based on a determination that no luma samples that are more than the threshold number of samples to the left of the luma block and below the top-left luma sample are needed for downsampling in accordance with the first filter, and wherein the first downsampled luma sample is in a column that is a first number of columns to the left of the luma block; and
applying a second, different filter to a second set of the fetched neighboring luma samples, to determine a second downsampled luma sample of the plurality of downsampled luma samples, based on a determination that at least one luma sample that is more than the threshold number of samples to the left of the luma block and below the top-left luma sample of the luma block is needed for downsampling in accordance with the first filter, wherein the second downsampled luma sample is in a column that is a second number of columns to the left of the luma block, and wherein the second number is greater than the first number.

58. The method of claim 57, wherein the first filter utilizes three luma samples from a first row that is left of the luma block and three luma samples from a second row that is below the first row.

59. The method of claim 57, wherein the second filter utilizes less than three luma samples from a first row that is left of the luma block and less than three luma samples from a second row that is below the first row.

60. The method of claim 53, wherein determining the plurality of downsampled luma samples comprises:
generating, without fetching, luma values that correspond to luma samples located more than the threshold number of samples left of the luma block and below the top-left luma sample of the luma block; and
applying a filter to the generated luma values to determine at least one downsampled luma sample of the plurality of downsampled luma samples.

61. The method of claim 53, wherein LM prediction encoding the chroma block based on the predictive block comprises subtracting the predictive block from the chroma block to generate a residual block to be used, by a video decoder, to reconstruct the chroma block.

62. The method of claim 53, further comprising:
encoding a flag for a current block that includes the luma block and the chroma block, wherein the flag indicates that LM prediction coding is enabled for the chroma block, and wherein encoding the flag comprises encoding the flag based on a context comprising one or more flags that indicate whether the LM prediction coding is enabled for neighboring blocks.

63. A device for encoding video data, the device comprising:
a video data memory; and
a video encoder comprising at least one of fixed-function circuitry or programmable circuitry, wherein the video encoder is configured to:
determine a luma block that corresponds to a chroma block;
fetch neighboring luma samples for downsampling the neighboring luma samples, wherein the fetched neighboring luma samples comprise a plurality of luma samples from a plurality of rows that are left of the luma block and exclude luma samples that are more than a threshold number of samples left of the luma block and below a top-left luma sample of the luma block;
determine a plurality of downsampled luma samples based on the fetched neighboring luma samples, wherein one of the downsampled luma samples corresponds to a downsampled luma sample that is the threshold number of samples left of the luma block, and wherein the downsampled luma sample is determined from luma samples from the plurality of rows that are left of the luma block;
determine one or more scaling parameters based on the downsampled luma samples;
determine a predictive block based on the one or more scaling parameters; and
linear model (LM) prediction encode the chroma block based on the predictive block.

64. The device of claim 63, wherein a coordinate of the top-left luma sample of the luma block is (x0, y0), and wherein the fetched neighboring luma samples exclude luma samples having an x-coordinate less than (x0-k) and a y-coordinate greater than y0, wherein k is the threshold number and k is an integer larger than 0.

65. The device of claim 64, wherein k equals 4.

66. The device of claim 63, wherein one of the downsampled luma samples corresponds to a downsampled luma sample more than two columns to the left of the top-left luma sample.

67. The device of claim 63, wherein to determine the plurality of downsampled luma samples, the video encoder is configured to:
apply a first filter to a first set of the neighboring luma samples, to determine a first downsampled luma sample of the plurality of downsampled luma samples, based on a determination that no luma samples that are more than the threshold number of samples to the left of the luma block and below the top-left luma sample are needed for downsampling in accordance with the first filter, and wherein the first downsampled luma sample is in a column that is a first number of columns to the left of the luma block; and
apply a second, different filter to a second set of the neighboring luma samples, to determine a second downsampled luma sample of the plurality of downsampled luma samples, based on a determination that at least one luma sample that is more than the threshold number of samples to the left of the luma block and below the top-left luma sample of the luma block is needed for downsampling in accordance with the first filter, wherein the second downsampled luma sample is in a column that is a second number of columns to the left of the luma block, and wherein the second number is greater than the first number.

68. The device of claim 67, wherein the first filter utilizes three luma samples from a first row that is left of the luma block and three luma samples from a second row that is below the first row.

69. The device of claim 67, wherein the second filter utilizes less than three luma samples from a first row that is left of the luma block and less than three luma samples from a second row that is below the first row.

70. The device of claim 63, wherein to determine the plurality of downsampled luma samples, the video encoder is configured to:
generate, without fetching, luma values that correspond to luma samples located more than the threshold number of samples left of the luma block and below the top-left luma sample of the luma block; and
apply a filter to the generated luma values to determine at least one downsampled luma sample of the plurality of downsampled luma samples.

71. The device of claim 63, wherein to LM prediction encode the chroma block based on the predictive block, the video encoder is configured to subtract the predictive block from the chroma block to generate a residual block, to be used by a video decoder, to reconstruct the chroma block.

72. The device of claim 63, wherein the video encoder is configured to:
encode a flag for a current block that includes the luma block and the chroma block, wherein the flag indicates that LM prediction coding is enabled for the chroma block, and wherein encoding the flag comprises encoding the flag based on a context comprising one or more flags that indicate whether the LM prediction coding is enabled for neighboring blocks.

* * * * *